US011327035B2

(12) United States Patent
Bauer

(10) Patent No.: US 11,327,035 B2
(45) Date of Patent: May 10, 2022

(54) METHOD FOR MEASURING THERMAL RESISTANCE BETWEEN A THERMAL COMPONENT OF AN INSTRUMENT AND A CONSUMABLE

(71) Applicant: ILLUMINA, INC., San Diego, CA (US)

(72) Inventor: W. Craig Bauer, San Diego, CA (US)

(73) Assignee: ILLUMINA, INC., San Diego, CA (US)

( * ) Notice: Subject to any disclaimer, the term of this patent is extended or adjusted under 35 U.S.C. 154(b) by 0 days.

(21) Appl. No.: 16/937,781

(22) Filed: Jul. 24, 2020

(65) Prior Publication Data

US 2021/0048400 A1    Feb. 18, 2021

Related U.S. Application Data

(60) Provisional application No. 62/887,901, filed on Aug. 16, 2019.

(30) Foreign Application Priority Data

Sep. 6, 2019  (NL) ..................................... 2023792

(51) Int. Cl.
*G01N 25/00* (2006.01)
*G01K 1/00* (2006.01)
(Continued)

(52) U.S. Cl.
CPC ............. *G01N 25/18* (2013.01); *G01N 25/72* (2013.01)

(58) Field of Classification Search
USPC ..................... 374/43, 163, 141, 57
See application file for complete search history.

(56) References Cited

U.S. PATENT DOCUMENTS

| 2005/0002435 | A1  | 1/2005 | Hashimoto et al. |
| 2020/0230607 | A1  | 7/2020 | Kobari et al. |
| 2021/0109047 | A1* | 4/2021 | Miao ...................... G01N 25/02 |

FOREIGN PATENT DOCUMENTS

| EP | 3443111    | 2/2019 |
| TW | 201510519 A | 3/2015 |

(Continued)

*Primary Examiner* — Mirellys Jagan
(74) *Attorney, Agent, or Firm* — Frost Brown Todd LLC

(57) ABSTRACT

A method for measuring thermal resistance between a thermal component of an instrument and a consumable includes contacting a known consumable with a thermal component to be tested; driving the thermal component using a periodic sine wave input based on a predetermined interrogation frequency; measuring temperature outputs from a thermal sensor responsive to the periodic sine wave input; multiplying the temperature outputs by a reference signal in phase with the periodic sine wave input and calculating the resultant DC signal component to determine an in-phase component X; multiplying the plurality of temperature outputs by a 90° phase-shifted reference signal and calculating the resultant DC signal component to determine a quadrature, out-of-phase component Y; calculating a phase offset responsive to the periodic sine wave input based on $\tan^{-1}(Y/X)$ or a tan 2(X,Y); and determining a resistance value for the thermal interface using a calibrated resistance-phase offset equation and the calculated phase offset.

20 Claims, 13 Drawing Sheets

(51) Int. Cl.
    *G01N 25/18*     (2006.01)
    *G01N 25/72*     (2006.01)

(56) References Cited

FOREIGN PATENT DOCUMENTS

| | | |
|---|---|---|
| TW | 201521132 A | 6/2015 |
| TW | 201704761 A | 2/2017 |
| TW | 201802485 A | 1/2018 |
| TW | 201809712 A | 3/2018 |
| TW | 201818088 A | 5/2018 |
| TW | 201920920 A | 6/2019 |
| WO | 2018150648 | 8/2018 |

\* cited by examiner

| Measurement Repeatablility ||||
|---|---|---|---|
| Instrument | Consumable | Res. (K/W) | Remarks |
| P1-3 | 1 | 0.35878 | |
| P1-3 | 1 | 0.36222 | Unload and reload consumable |
| P1-3 | 1 | 0.36139 | Unload and reload consumable |
| P1-3 | 1 | 0.35824 | Unload and reload consumable |
| P1-3 | 1 | 0.35664 | Unload and reload consumable |
| | Ave. | 0.359454 | |
| | Std. Dev. | 0.002304<br>0.641% | Measurement very repeatable |
| P1-3 | None | 1.313 | No consumable at all-unloaded position. Missing consumable easily detected |

FIG. 13

| Instrument Variation |||
|---|---|---|
| | Res. (K/W) ||
| Cartridge | 1 | 2 |
| Instrument | | |
| P1-03 | 0.43357 | |
| P1-04 | 0.40 | 0.41 |
| P1-11 | 0.40 | 0.42 |
| P1-12 | 0.433403 | 0.389652 |
| P1-13 | 0.401867 | 0.407964 |
| P1-14 | 0.392474 | 0.408632 |
| P1-15 | 0.403238 | 0.377454 |
| | | |
| Average | 0.4089 | 0.4010 |
| StDev | 0.0171 | 0.0143 |
| MIN | 0.3925 | 0.3775 |
| MAX | 0.4336 | 0.4150 |
| | | |
| % sigma | 4.19% | 3.57% |

FIG. 14

| Consumable Variation | | |
|---|---|---|
| Sample | Consumable Design A Res. (K/W) | Consumable Design B Res. (K/W) |
| 1 | 0.411 | 0.365 |
| 2 | 0.428 | 0.345 |
| 3 | 0.431 | 0.364 |
| 4 | 0.425 | 0.364 |
| 5 | 0.417 | 0.366 |
| 6 | 0.426 | 0.344 |
| 7 | 0.429 | 0.366 |
| 8 | 0.423 | 0.366 |
| 9 | 0.416 | |
| 10 | 0.417 | |
| Ave. | 0.4223 | 0.3600 |
| St.Dev. | 0.0066  1.57% | 0.0096  2.668% |
| MIN | 0.411 | 0.344 |
| MAX | 0.411 | 0.366 |

… # METHOD FOR MEASURING THERMAL RESISTANCE BETWEEN A THERMAL COMPONENT OF AN INSTRUMENT AND A CONSUMABLE

RELATED APPLICATIONS

This application claims priority to U.S. Provisional Patent App. No. 62/887,901, entitled "Method for Measuring Thermal Resistance at Interface between Consumable and Thermocycler," filed on Aug. 16, 2019, which is incorporated by reference herein in its entirety. This application also claims priority to Netherlands Patent App. No. 2023792, entitled "Method for Measuring Thermal Resistance at Interface between Consumable and Thermocycler," filed on Sep. 6, 2019, which is incorporated by reference herein in its entirety.

BACKGROUND

Various biochemical protocols involve performing a large number of controlled reactions on support surfaces or within designated reaction chambers. The controlled reactions may be conducted to analyze a biological sample or to prepare the biological sample for subsequent analysis. During or between the controlled reactions, the reaction chamber and/or components thereof may be thermally controlled to perform different reactions and/or to improve rates of reactions. The analysis may identify or reveal properties of chemicals involved in the reactions. For example, in an array-based, cyclic sequencing assay (e.g., sequencing-by-synthesis (SBS)), a dense array of deoxyribonucleic acid (DNA) features (e.g., template nucleic acids) are sequenced through iterative cycles of enzymatic manipulation. After each cycle, an image may be captured and subsequently analyzed with other images to determine a sequence of the DNA features. In another biochemical assay, an unknown analyte having an identifiable label (e.g., fluorescent label) may be exposed to an array of known probes that have predetermined addresses within the array. Observing chemical reactions that occur between the probes and the unknown analyte may help identify or reveal properties of the analyte.

SUMMARY

The following provides a summary of certain embodiments of the present disclosure. This summary is not an extensive overview and is not intended to identify key or critical aspects or elements of the present invention or to delineate its scope.

Described herein are devices, systems, and methods for measuring thermal resistance at the interface between a consumable item such as, for example, a flow cell and an instrument or thermal component thereof such as, for example, a thermoelectric cooler (TEC) (e.g., a Peltier driven thermal system). The described method may also be referred to as a transient response test for determining thermal interface resistance to a consumable flow cell. Implementations of the disclosed method use a periodic sinusoidal drive input to a thermal component, such as a TEC, for measuring the thermal response of the thermal component itself. Although some examples provided herein may be described in reference to TECs, such a thermal component is only an example and the methods described herein may be applicable to other thermal components such as, for example, resistive heaters and thermal blocks. Advantages of this method may include: (i) reducing thermal stress experienced by a TEC by not changing the power input to the TEC in stepwise fashion; (ii) reducing the time required to acquire multiple cycles of data; (iii) allowing phase-sensitive detection techniques to achieve very high sensitivity while permitting excitation levels for the test to be relatively low; and (iv) inferring thermal contact to the consumable without requiring a thermal sensor on the consumable. The thermal response of the thermal component to a periodic drive input may be frequency dependent. The specific behavior of the thermal component, such as a TEC, may be modeled in Simulation Program with Integrated Circuit Emphasis (SPICE) software with an electrical-equivalent circuit. The disclosed method may be used to identify incomplete or reduced thermal interfaces between a component to be thermally controlled, such as a flow cell, and a thermal component, such as a TEC. For instance, the method disclosed herein may be used to identify various issues with proper loading of flow cells with a TEC of an instrument, such as springs that did not fully engage, which may affect the performance of one or more thermally controlled reactions. The disclosed method may be deployed as an automated field diagnostic and pre-run test to identify dirty or contaminated consumables or instrument thermal components. The method may also be used as a quality control process for testing the thermal component, as a quality control process for testing the consumable, and/or as a diagnostic process for testing during loading of a consumable to an instrument.

An implementation relates to a method for measuring thermal resistance between a thermal component of an instrument and a consumable, comprising: contacting a known consumable with a thermal component of an instrument to be tested; driving the thermal component using a periodic sine wave input based on a predetermined interrogation frequency; measuring a plurality of temperature outputs from a thermal sensor responsive to driving the thermal component using the periodic sine wave input; multiplying the plurality of temperature outputs by a reference signal in phase with the periodic sine wave input and calculating the resultant direct current (DC) signal component to determine an in-phase component, X; multiplying the plurality of temperature outputs by a 90° phase-shifted reference signal and calculating the resultant DC signal component to determine a quadrature, out-of-phase component, Y; calculating a phase offset responsive to the periodic sine wave input based on $\tan^{-1}(Y/X)$ or a $\tan 2(X,Y)$; determining a resistance value for the thermal interface using a calibrated resistance-phase offset equation and the calculated phase offset; and comparing the determined resistance value to a predetermined resistance threshold value. The method may be used as a quality control process for testing the thermal component.

Variations on any one or more of the above implementations exist, wherein the determined resistance value is above the predetermined resistance threshold value, the method further comprising determining the thermal component has a defect at the thermal interface surface based on the determined resistance value being above the predetermined resistance threshold value.

Variations on any one or more of the above implementations exist, wherein the determined resistance value is below the predetermined resistance threshold value, the method further comprising determining the thermal component is acceptable based on the determined resistance value being below the predetermined resistance threshold value.

Variations on any one or more of the above implementations exist, wherein the thermal component comprises a thermoelectric cooler.

Variations on any one or more of the above implementations exist, wherein the consumable comprises a flow cell.

Variations on any one or more of the above implementations exist, wherein the predetermined interrogation frequency is determined based on an estimated RC corner value for the known consumable and the thermal component of the instrument.

An implementation relates to a method for measuring thermal resistance between a thermal component of an instrument and a consumable, comprising: contacting a consumable to be tested with a known thermal component of an instrument; driving the thermal component using a periodic sine wave input based on a predetermined interrogation frequency; measuring a plurality of temperature outputs from a thermal sensor responsive to driving the thermal component using the periodic sine wave input; multiplying the plurality of temperature outputs by a reference signal in phase with the periodic sine wave input and calculating the resultant DC signal component to determine an in-phase component, X; multiplying the plurality of temperature outputs by a 90° phase-shifted reference signal and calculating the resultant DC signal component to determine a quadrature, out-of-phase component, Y; calculating a phase offset responsive to the periodic sine wave input based on $\tan^{-1}$ (Y/X) or a tan 2(X,Y); determining a resistance value for the thermal interface using a calibrated resistance-phase offset equation and the calculated phase offset; and comparing the determined resistance value to a predetermined resistance threshold value. The method may be used as a quality control process for testing the consumable.

Variations on any one or more of the above implementations exist, wherein the determined resistance value is above the predetermined resistance threshold value, the method further comprising determining the consumable has a defect at the thermal interface surface based on the determined resistance value being above the predetermined resistance threshold value.

Variations on any one or more of the above implementations exist, wherein the determined resistance value is below the predetermined resistance threshold value, the method further comprising determining the consumable is acceptable based on the determined resistance value being below the predetermined resistance threshold value.

Variations on any one or more of the above implementations exist, wherein the thermal component comprises a thermoelectric cooler.

Variations on any one or more of the above implementations exist, wherein the consumable comprises a flow cell.

Variations on any one or more of the above implementations exist, wherein the predetermined interrogation frequency is determined based on an estimated RC corner value for the consumable and the known thermal component of the instrument.

An implementation relates to a method for measuring thermal resistance between a thermal component of an instrument and a consumable, comprising: contacting a consumable with a thermal component of an instrument; driving the thermal component using a periodic sine wave input based on a predetermined interrogation frequency; measuring a plurality of temperature outputs from a thermal sensor responsive to driving the thermal component using the periodic sine wave input; multiplying the plurality of temperature outputs by a reference signal in phase with the periodic sine wave input and calculating the resultant DC signal component to determine an in-phase component, X; multiplying the plurality of temperature outputs by a 90° phase-shifted reference signal and calculating the resultant DC signal component to determine a quadrature, out-of-phase component, Y; calculating a phase offset responsive to the periodic sine wave input based on $\tan^{-1}$ (Y/X) or a tan 2(X,Y); determining a resistance value for the thermal interface using a calibrated resistance-phase offset equation and the calculated phase offset; comparing the determined resistance value to a first predetermined resistance threshold value; comparing the determined resistance value to a second predetermined resistance threshold value; and determining a characteristic of the thermal interface based on the comparison of the determined resistance value to the first and second predetermined resistance threshold values. The method may be used as a diagnostic process for testing during loading of a consumable to an instrument.

Variations on any one or more of the above implementations exist, wherein the determined resistance value is below the first predetermined resistance threshold value, the method further comprising determining the thermal interface surface is acceptable based on the determined resistance value being below the first predetermined resistance threshold value.

Variations on any one or more of the above implementations exist, wherein the determined resistance value is above the second predetermined resistance threshold value, the method further comprising determining the consumable is not inserted in the instrument based on the determined resistance value being above the second predetermined resistance threshold value.

Variations on any one or more of the above implementations exist, wherein the determined resistance value is below the second predetermined resistance threshold value and above the first predetermined resistance threshold value, the method further comprising determining a defect or debris is at the thermal interface surface based on the determined resistance value being below the second predetermined resistance threshold value and above the first predetermined resistance threshold value.

Variations on any one or more of the above implementations exist, wherein the thermal component comprises a thermoelectric cooler.

Variations on any one or more of the above implementations exist, wherein the consumable comprises a flow cell used for sequencing by synthesis.

Variations on any one or more of the above implementations exist, wherein the predetermined interrogation frequency is determined based on an estimated RC corner value for the consumable and the known thermal component of the instrument.

An implementation relates to a computer-readable medium having stored thereon a computer program comprising instructions to cause the instrument to execute the method of any of the above implementations.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The details of one or more implementations are set forth in the accompanying drawings and the description below.

Other features, aspects, and advantages will become apparent from the description, the drawings, and the claims, in which:

FIG. 13 depicts a table demonstrating measurement repeatability using the described test methods;

FIG. 14 depicts a table illustrating instrument variation;

DETAILED DESCRIPTION

Figure 1:
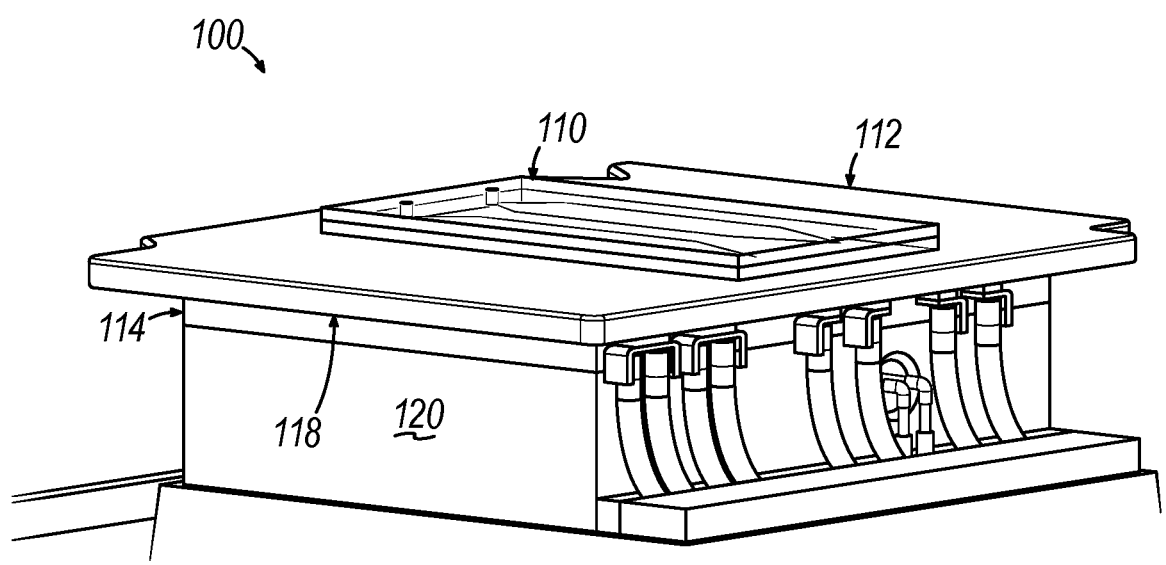
FIG. 1 depicts a front perspective view of an assembly that is illustrative of a positional relationship between a thermal component of an instrument (e.g., a TEC) and a consumable (e.g., a flow cell) and to which the disclosed method is directed regarding establishing and maintaining the quality and integrity of the positional relationship.

In some instances, temperature control of consumables, such as flow cells, used in processes such as sequencing-by-synthesis may rely on the assumption that a consumable reaches a known offset relative to a thermal component, such as the thermal block of a TEC, that the consumable contacts in an instrument. Initially, that offset may be factory calibrated. However, if the contact between the consumable and the thermal block of the TEC is different than during factory calibration, such as from intervening debris, this may result in steady state temperature errors. Such errors may scale in magnitude with the temperature of the thermal block of the TEC relative to ambient temperature. At relatively low temperatures, steady state offset errors may be within predetermined error values. However, such errors may represent a significant fraction of a thermal error budget.

Differences in thermal resistance at the interface between a thermal component of the instrument and a consumable may also result in differences in the time period for the consumable to reach a desired temperature. In implementations where the mass of the thermal block of the TEC is significantly greater than the mass of the consumable of the instrument, the time period for achieving steady state may be dominated by the time period involved in heating and cooling the mass of the thermal block of the TEC. Additionally, if the time period allowed for thermal operations is a sufficiently long time period, then variations in the thermal lag of the consumable behind the thermal block of the TEC may be negligible or unnoticed.

However, to achieve a more rapid thermal ramping (i.e., decreasing the time to transition from a first temperature to a second temperature), the mass of the thermal block of the TEC may be reduced such that it is substantially equal to or less than the mass of the consumable. In addition, some thermal engines of TECs may also have a very high heat pumping capability. As a result, such a lower mass thermal block of the TEC may ramp temperature very fast and the rate at which the consumable temperature will follow based on heat transfer will depend on the quality of the thermal interface. Furthermore, if user error results in the consumable being loaded in the instrument improperly, the thermal block of the TEC may rapidly reach temperatures that may quickly cause damage (e.g., within seconds) if the thermal interface quality is not detected. Accordingly, described herein are systems and methods for measuring the quality of a thermal interface between a thermal component of an instrument, such as a TEC, and a thermally controlled component, such as a flow cell.

To confirm that a consumable is in contact with the thermal block of the TEC and/or to determine the quality of the thermal interface between the consumable and the thermal block, the thermal block may be heated or cooled. The rate that the thermal block changes temperature when pumping heat depends on the thermal resistance between the thermal block and the consumable and the relative heat capacitances of the consumable and the thermal block. As the relative heat capacitances are known, measurement of the rate that the thermal block changes temperature when pumping heat may be used to determine the thermal resistance between the thermal block and the consumable.

One technique for characterizing such a system is a step-response, where a system is excited with a stepwise change and the response is measured in the time domain. The time domain response may be characterized by the time constant tau ($\tau$). Performing such a test on a real Peltier-driven thermal system, such as a TEC, may be complicated by several factors. For instance, the heat pumped by a TEC depends on the temperature difference ($\Delta T$) across the TEC and the resistance of the TEC itself, thereby complicating the application of a known input step height. In addition, the time for the thermal engine of the TEC to change the temperature of the thermal block of the TEC may be non-zero due to the non-zero mass of the TEC and may vary with the ambient or a heat sink temperature, the starting temperature of the thermal block, and the TEC electrical resistance, thus a true step function may be difficult to implement and/or may require recalculation for any change in ambient conditions. Moreover, stepwise power inputs to a TEC may be mechanically, thermally, or electrically stressful on the TEC and may lead to a reduced lifetime of the TEC when performed repeatedly.

Accordingly, the present disclosure provides a method for measuring thermal resistance at the interface between a consumable and a thermal component of the instrument that may reduce the mechanical, thermal, and/or electrical stress to the thermal component, may acquire several datapoints in a reduced period of time, may achieve high sensitivity detection of the resistance at the thermal interface while permitting excitation levels applied to the TEC to be relatively low, and/or may utilize fewer inputs to determine the resistance at the thermal interface by using a time-domain component of the response without requiring a calibration or use of an internal thermometer of the thermal component or an external thermal sensor to detect the temperature of the thermal component.

Various implementations of the present invention are now described with reference to the Figures. Reference numerals are used throughout the detailed description to refer to the various elements and structures. Although the following detailed description contains many specifics for the purposes of illustration, a person of ordinary skill in the art will appreciate that many variations and alterations to the following details are within the scope of the invention. Accordingly, the following embodiments of the invention are set forth without any loss of generality to, and without imposing limitations upon, the claimed invention.

Described herein are devices, systems, and methods for measuring thermal resistance at the interface between a consumable item such as, for example, a flow cell and a component of an instrument such as, for example, a TEC or a heater. Also described herein is a transient response test for determining thermal interface resistance to a consumable flow cell.

Figure 2:
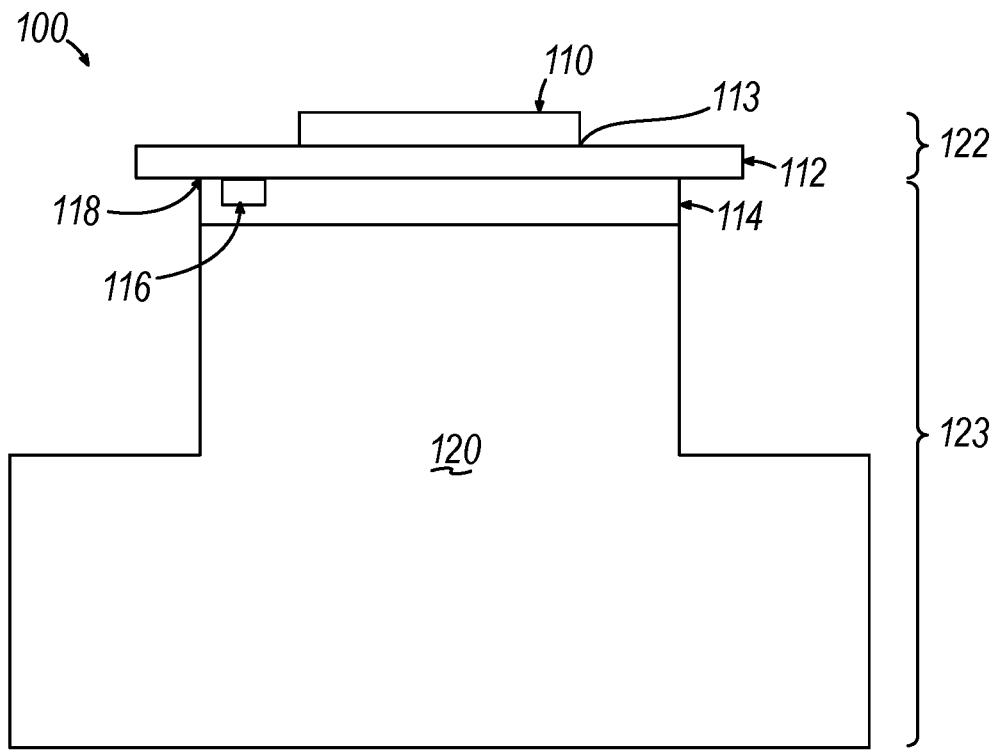
FIG. 2 depicts a side view of the assembly of FIG. 1, where a thermal sensor is visible in the instrument.
Figure 3:
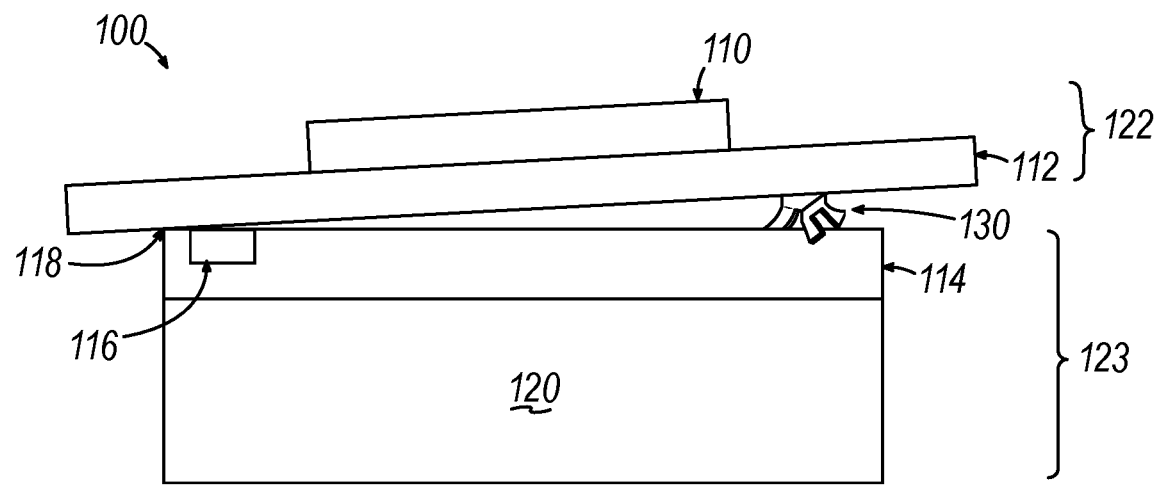
FIG. 3 depicts the assembly of FIG. 2, where a contaminant has disrupted the positional relationship between the thermal component of the instrument and the consumable.

With reference to the Figures, FIGS. 1-3 provide various illustrations of a thermal component of an instrument, such as a TEC, and consumable thermal assembly 100. Although only a thermal component of the instrument is depicted, the instrument may include additional components, such as cartridge interfaces, fluidics management components, analytical computing engines, etc. In FIG. 1, which depicts, in a simplified manner, a TEC with a consumable mounted thereon, a flow cell 110 may be positioned on top of a carrier plate 112, which may sit on top of a TEC 114, which may be positioned on top of a heat sink 120. In some implementations, the carrier plate 112 and the flow cell 110 may form part of a flow cell cartridge 122 and the TEC 114 and the heat sink 120 may be combined as a TEC assembly 123 within a base instrument. In other implementations, the carrier plate 112, the TEC 114, and the heat sink 120 may be combined as the TEC assembly 123 within the base instrument. In still further implementations, an additional carrier plate (not shown) or other intervening components may be provided between one or more of the components depicted herein. For example, thermally conductive adhesives between the carrier plate 112 and the flow cell 110, between the carrier plate 112 and the TEC 114, and/or between the TEC 114 and the heat sink 120, may be utilized to adhere one or more of the foregoing components together while improving and/or assisting in thermal conduction between the components (e.g., the thermal conductive adhesive may be applied to fill in any defects of one or more components that may reduce thermal conduction).

In some implementations, a thermal sensor (e.g., thermometer) 116, shown in FIGS. 2-3, may be mounted within TEC 114 for detecting the temperature of the TEC 114 during operation. A thermal interface 118 occurs where the carrier plate 112 contacts the upper surface of the TEC 114 and this thermal interface may change each time a new flow cell 110 is mated to the TEC 114. The quality of the thermal interface 118 may affect thermal control of the flow cell 110. The upper surface of the TEC 114 may not be visible to the user of the consumable thermal assembly 100. For example, when a cartridge (not shown) carrying the flow cell 110 and/or the flow cell 110 itself is inserted into a base instrument, the flow cell 110 and the TEC assembly 123 with which the flow cell 110 interfaces for thermal control of the flow cell 110 may be inside a housing of the base instrument and obscured from view. The housing of the base instrument may limit or reduce contaminants from affecting processes therein. However, ensuring that a surface 113 of the carrier plate 112 is free from debris, such as dust, dirt, liquid, etc., may be difficult to do without disassembly of the housing and/or portions of the instrument in order to visually inspect the surface 113.

For some implementations using consumables, such as flow cells 110, that are used in DNA sequencing and for other purposes in or with instruments or components thereof, such as TECs 114 and/or assemblies including thermal components, a determination is made regarding whether or not the flow cell 110 and/or the carrier plate 112 of the flow cell cartridge 122 has made sufficient or acceptable thermal contact with the TEC assembly 123. FIG. 2 depicts a side view of the assembly of FIG. 1 showing flow cell 110 positioned on top of carrier plate 112, which is sitting on top of TEC 114, which is positioned on top of heat sink 120. In some implementations, thermometers or other thermal sensors may not be included in a flow cell 110 and/or on a flow cell carrier plate 112. The inclusion of a thermal sensor may add complexity and/or additional other technical implementation issues. Moreover, for single-use consumables, the addition of a thermal sensor may increase the cost, reduce reliability, and/or introduce additional unknowns to the consumable.

However, for chemical, medical, and/or biotechnical consumables that may rely upon sensitive temperature controls to accommodate desired chemical reactions, determining the quality of a thermal interface with the consumable may be useful to ensure reliable and repeatable reactions within the consumable. In some instances, the thermal interface may be entirely absent if a consumable is improperly loaded, either by user error or instrument loading errors.

In addition to improper insertion of a consumable, such as the flow cell 110, and/or improper mounting of the consumable within the instrument, contamination occurring at the thermal interface 118 between the flow cell 110 and/or carrier plate 112 and the thermal component, such as the TEC assembly 122, or wear of the TEC assembly-side of the interface, such as wear on the carrier plate 112, may also disrupt thermal contact and heat transfer between the consumable and the thermal component of the instrument. FIG. 3 depicts the assembly of FIG. 2 showing flow cell 110 positioned on top of carrier plate 112, which is sitting on top of TEC 114, which is positioned on top of heat sink 120. In FIG. 3, a contaminant 130, such as dirt, dust, dehydrated reactants, debris, etc., has disrupted the thermal interface 118 between the consumable and the instrument. Accordingly, heat may not transfer properly between the two items. As described herein, such disruptions may be detected in the response rate of the thermal sensor 116 of the TEC 114 to a carefully controlled drive input.

The disclosed method uses a thermal sensor (e.g., thermal sensor 116) that is located within or proximate to a component of an instrument (e.g., TEC 114), to detect the rate at which heat flows from the component of the instrument to a consumable (e.g., flow cell cartridge 122) for determining the thermal resistance at the interface (e.g., thermal interface (118)) between the instrument and the consumable. This method does not require any measurement of the temperature of the consumable and may be used to verify the quality of thermal contact prior to dispensing samples and reagents into a flow cell 110, thereby preventing wasted resources due to a contaminated interface, improper mating from user error, or hardware malfunction. The method may also be used to identify interface-related quality problems during factory instrument quality control. Similarly, the method may be used to identify manufacturing defects that are present in components such as a TEC 114, a flow cell 122, or other components where defects in manufacturing may adversely affect thermal resistance at the thermal interface 118, may add unintended thermal capacitance to these components, or may produce detrimental thermal shorting across TEC 114.

In some implementations, the method includes driving the TEC 114 with a periodic sine wave input; measuring the periodic thermal response of the thermal sensor 116 within the TEC 114 to the sine wave input; isolating the component of the thermal response signal that is at the frequency of the sine wave input and determining the phase shift thereof relative to the drive signal; and calculating the thermal resistance of the thermal interface 118 between the TEC 114 and the flow cell cartridge (122) using the phase shift (delay). This method may be completed rapidly. By way of example only, about 10 excitation cycles may be collected within 30 seconds at 0.3 Hz. Alternatively, fewer excitation cycles may be collected within a shorter time period.

For driving the TEC 114 (or another thermal component of an instrument) with a periodic sine wave input, in some implementations of this method, firmware located in the TEC drive electronics initiates a periodic drive signal. As this occurs, the TEC 114 is held stable at room temperature and low input power (e.g., low amplitude drive) is utilized. A suitable drive frequency may be selected by producing a Bode plot from a SPICE model of an electrical-equivalent circuit and analyzing the plot for useful response characteristics. SPICE is a general-purpose, open-source, analog electronic circuit simulator that is used in integrated circuit and board-level design to analyze the integrity of circuit designs and to predict circuit behavior. The drive frequency may be based on an RC corner frequency for the thermal system. The RC corner frequency provides a frequency where the slope or change in phase offset to be greatest for small changes in resistance values. That is, selecting a frequency at or near the RC corner frequency for the thermal system may provide greater sensitivity based on small changes in resistance at the thermal interface 118.

Figure 4:
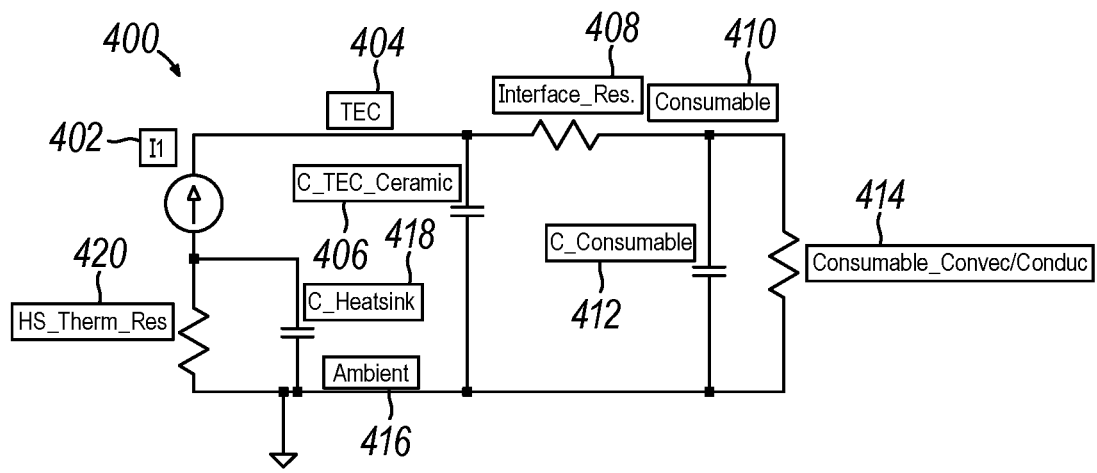
FIG. 4 depicts a schematic representing the electrical-equivalent model of a TEC flow cell system.

FIG. 4 depicts an electrical schematic 400, which represents the electrical-equivalent model of a TEC flow cell system. In schematic 400, I1 (402) is the alternating heat pumped by the TEC 114. The amplitude of this periodic input is estimated based on the capabilities of the TEC 114. However, the selected a metric (phase lag) is independent of the drive amplitude. TEC (404) is the node where the TEC 114 temperature is measured with an integrated thermal sensor 116, which may be placed in very intimate contact with C_TEC_Ceramic (406) so as to contribute minimal thermal resistance to the thermal circuit. C_TEC_Ceramic (406) is the thermal capacitance of the TEC top ceramic (with regard to disclosed implementations) or, more generically, all the mass between the consumable and the thermal engine (TEC elements). C_TEC_Ceramic (406) is calculated from first principles based on the geometry of the component(s) and the heat capacity of the material. Interface_Res (408) is the thermal resistance between the TEC 114 and consumable (e.g., flow cell cartridge 122), which is the value determined by the disclosed method. Interface_Res (408) is modeled with an estimate based on initial observations and varied in a range near this initial estimate to determine how the phase lag depends on this value. Consumable (410) is the node representing the temperature of the consumable (e.g., flow cell cartridge 122) and is an output of the model that may be used to verify the model performance using a consumable outfitted with a thermal sensor(s). C_Consumable (412) is the thermal capacitance of the consumable (e.g., flow cell cartridge 122), as determined by its geometry and material heat capacity. Consumable_Convec/Conduc (414) is the thermal resistance to ambient of the consumable (e.g., flow cell cartridge 122) due to convection and conduction losses.

Consumable_Convec/Conduc (414) may be estimated based on geometry, airflow assumptions, and temperature assumptions; and the estimate may be verified with measurements designed to approximate the working conditions of the system. Where estimates retain some level of uncertainty, this value may be varied over a potential operating range to determine impact on thermal sensor 116 response and may have negligible impact at the interrogation frequency. Ambient (416) represents ambient temperature. In an electrical-equivalent model, this is thermal ground, and all other temperatures are relative to ambient. C_Heatsink (418) is the thermal capacitance of the heat engine heat sink (e.g., heat sink 120) as determined by calculation from geometry and material heat capacity. HS_Therm_Res (420) is the thermal resistance of the heat sink (e.g., heat sink 120) to ambient due to convection. HS_Therm_Res (420) is estimated based on known conditions in the system, verified experimentally, and varied in the model to demonstrate negligible impact to the signal of interest at the interrogation frequency.

Figure 5:
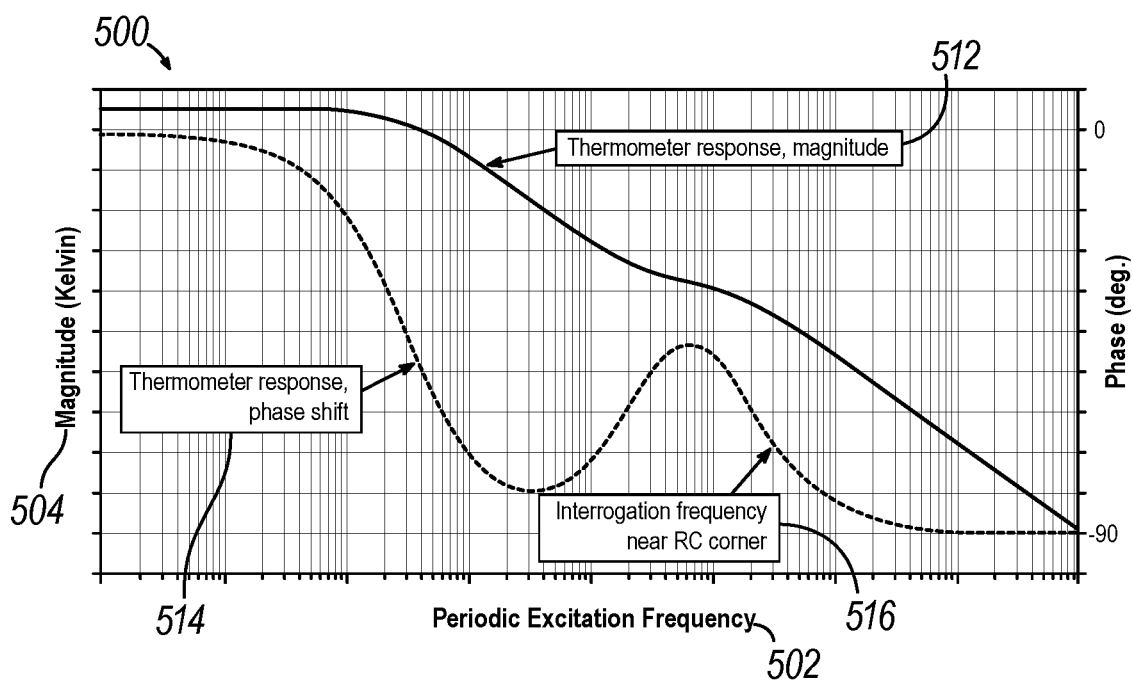
FIG. 5 depicts a Bode plot facilitating identification of a frequency for producing fast measurements and yielding a measurable signal that is near the corner frequency for R*C, where the x axis represents periodic excitation frequency and the y axis represents magnitude/phase.

FIG. 5 depicts a Bode plot facilitating identification of a frequency for producing fast measurements and yields a measurable signal that is near the corner frequency for R*C. In FIG. 5, predicted response 500 of thermal sensor 116 of TEC 114 is plotted on a graph where x axis 502 represents periodic excitation frequency and where y axis 504 represents magnitude/phase. Solid line 512 represents the magnitude of the response of thermal sensor 116 of TEC 114 when driven at various frequencies and as measured in dB of attenuation (relative to direct current (DC) excitation). Dotted line 514 represents the phase lag of the thermal sensor 116 behind the drive signal when driven at various frequencies and as measured in degrees. The interrogation frequency near the RC corner is shown at 516.

Figure 6:
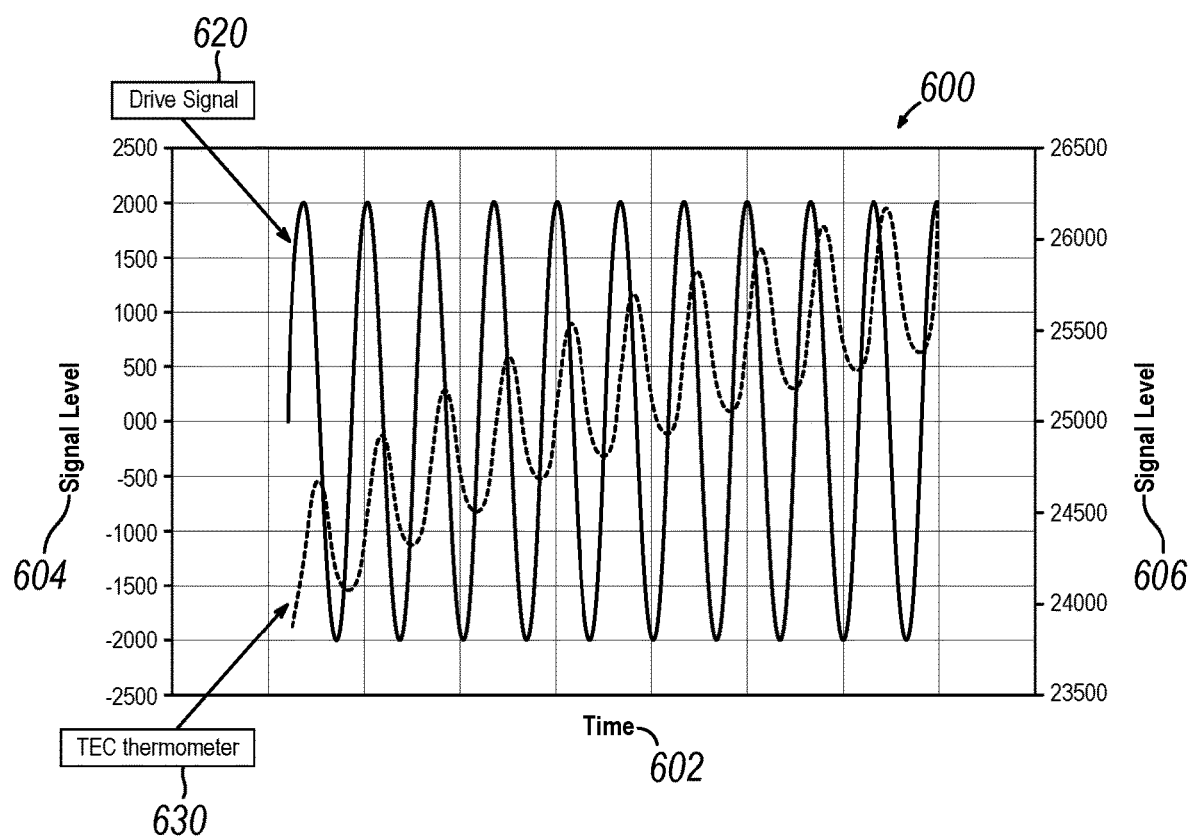
FIG. 6 depicts a graph illustrating TEC drive and thermal response drive signals for use in the described methods.

For measuring the periodic thermal response of the TEC 114 to the sine wave input using the on-board thermal sensor 116, in some implementations of the method, firmware located in the TEC drive electronics logs the thermal response signal. As shown in FIG. 6, the thermal response signal is not entirely at the drive frequency but exhibits additional low frequency and high frequency components (e.g., thermal drift and electronic noise). FIG. 6 depicts a graph illustrating an example of TEC drive and thermal response drive signals for use in the described methods. In FIG. 6, drive and thermal response 600 is plotted on a graph where the x-axis 602 represents time, where the left-side y-axis 604 represents the TEC 114 drive signal level, and the right-side y-axis 606 represents the signal level of thermal sensor 116. Drive signal 620 is a time trace of the TEC 114 drive level. TEC thermal sensor signal 630 is the actual response of the thermal sensor 116 in a TEC 114 when driven with the drive signal 620 shown, while TEC 114 is in contact with a consumable (e.g., flow cell cartridge 122). The disclosed methods are used to isolate the component of this signal that is at the same frequency as the drive signal and to determine its phase shift.

For isolating the component of the thermal response signal that is at the frequency of the sine wave input (ω) and determining the phase shift thereof relative to the drive signal, in some implementations of the method, the response signal is multiplied by a reference signal in the time domain. The DC component of the result is the amplitude of the in-phase signal, $A_{in}$. The response signal may also be multiplied by a 90° phase-shifted reference, in time domain. The DC component of the result is the amplitude of the quadrature (out-of-phase) signal, $A_Q$. The DC component of these signals may be obtained using a least-squares fit to a sine wave. The DC component may also be obtained by integrating the signal over a large number of cycles. This integration may be performed with an analog circuit, such as in a lock-in amplifier; or digitally, such as with a microprocessor. The phase of the response signal is $\tan^{-1}(A_Q/A_{in})$ or a tan 2(Ain, Aq). The DC components $A_{in}$ and $A_Q$ are small relative to the periodic amplitude A.

Some alternate methods for determining the phase shift of the response of the thermal sensor 116 include using a peak-finding algorithm to find the peaks of the drive and response signals and calculating the average delay between peaks. Some other alternate methods for determining the phase shift of the response of the thermal sensor 116 include fitting a sine wave to the drive signal and to the response signal and using the phase of the best fit function to establish the phase shift. Some other alternate methods for determining the phase shift of the response of the thermal sensor 116 include using the lock-in technique of multiplying the response signal by in-phase and quadrature reference signals, but finding the DC component of these signals by: (i) using a discrete Fourier transform and a digital low-pass filter; or (ii) averaging the resulting signals over an integer number of cycles.

Figure 7:
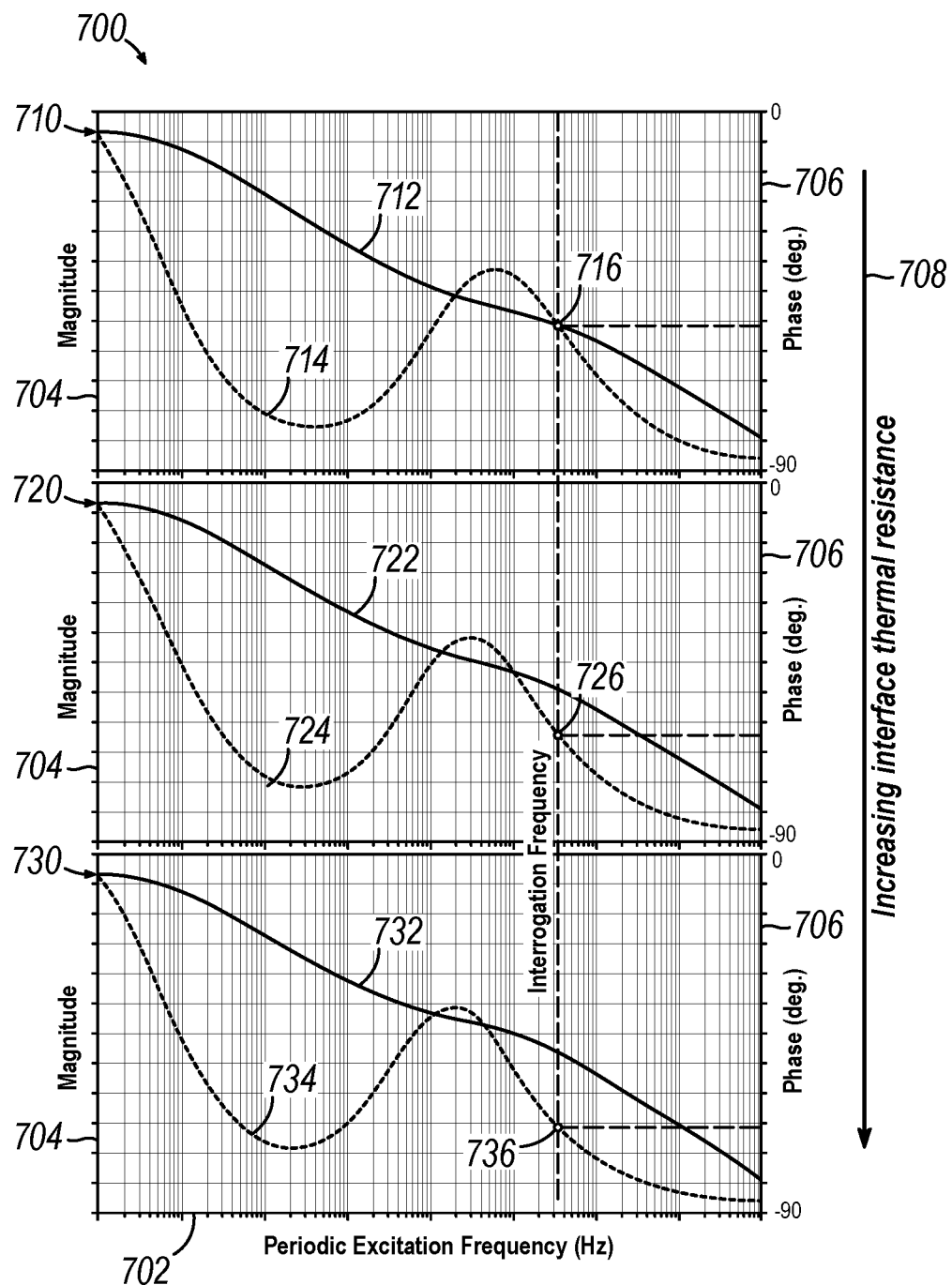
FIG. 7 depicts a series of graphs showing the conversion of phase shift to thermal resistance.
Figure 8:
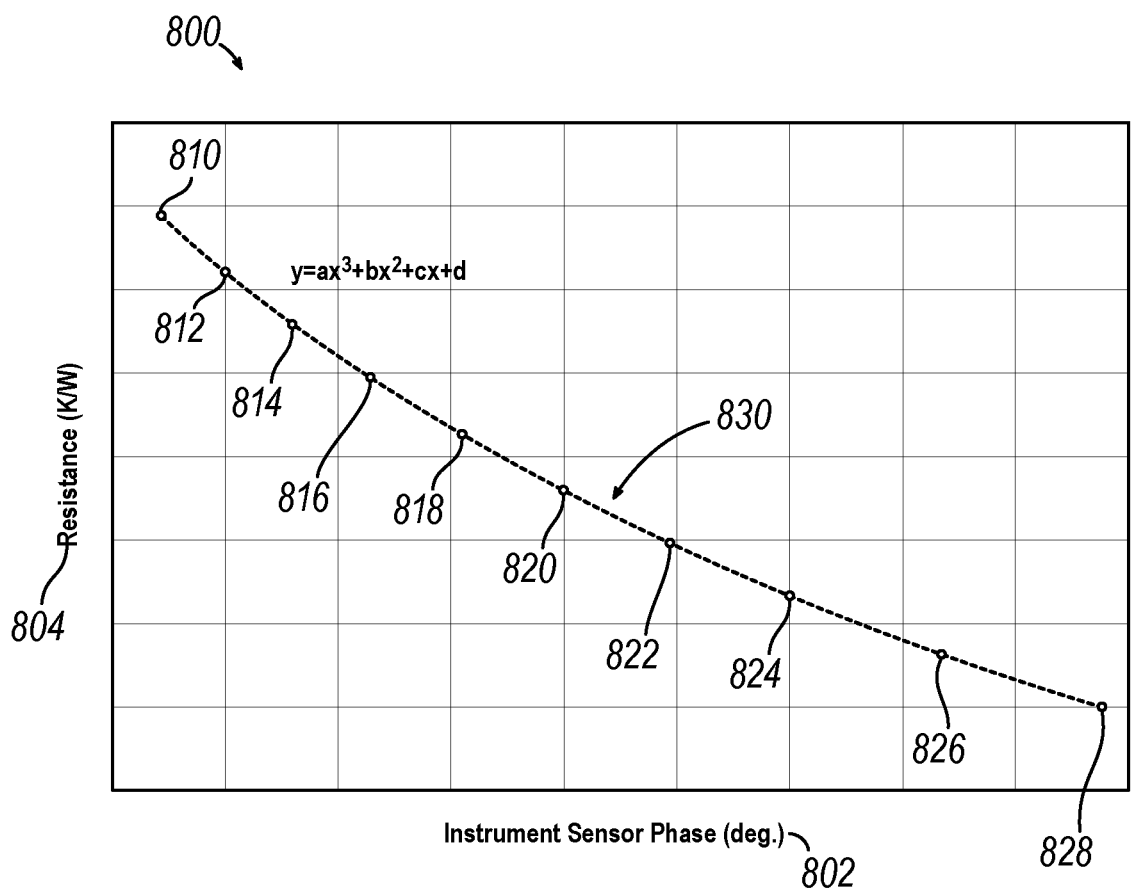
FIG. 8 depicts a graph showing a response curve specific to the 0.3 Hz excitation frequency used and to the specific thermal mass of the components in a tested TEC system.

For calculating the thermal resistance of the interface 118 between the TEC 114 and the consumable (e.g., flow cell cartridge 122) using the phase shift (delay), in some implementations of the method, thermal resistance may be estimated by modeling the thermal system with an electrical-equivalent circuit, such as that shown in FIG. 4, and generating a curve fit for a series of resistance values at a particular interrogation drive frequency. As resistance (R) changes, the phase of the response also changes. The foregoing model produces a phase (ϕ) to resistance (R) relationship at the particular interrogation drive frequency. An example of such a phase (ϕ) to resistance (R) relationship for the thermal system modeled in FIG. 4 over the resistance range 0.2 to 0.5 K/W results in a curve-fit of R=−0.00002237 ϕ³−0.003708 ϕ²−0.2163 ϕ−4.208 (see FIGS. 7 and 8). FIG. 7 includes a series of graphs showing the phase shift at a particular interrogation drive frequency as the thermal resistance increases. FIG. 8 provides a graph showing a response curve specific to an implementation using a 0.3 Hz excitation frequency used and to the specific thermal mass of the components of the modeled electrical-equivalent circuit TEC system of FIG. 4.

In FIG. 7, graph 700 depicts three Bode plots 710, 720, 730 showing an increase in absolute phase lag as Interface_Res 408 (shown in FIG. 4) increases when measured at a selected interrogation frequency. In Bode plot 710, solid line 712 represents the magnitude of the response of the thermal sensor 116 when driven at various frequencies 702 and as measured in dB of attenuation (relative to DC excitation) along y-axis 704; dotted line 714 represents the phase lag of the thermal sensor 116 behind the drive signal when driven at various frequencies 702 and as measured in degrees along y-axis 706; and point 716 represents the phase lag of dotted line 714 at the interrogation frequency.

In Bode plot 720 of FIG. 7, the resistance at the interface 118, such as Interface_Res 408, has increased. Thus, solid line 722 represents the magnitude of the response of the thermal sensor 116 when driven at various frequencies 702 and as measured in dB of attenuation (relative to DC excitation) along y-axis 704; dotted line 724 represents the phase lag of the thermal sensor 116 behind the drive signal when driven at various frequencies 702 and as measured in degrees along y-axis 706; and point 726 represents the phase lag of dotted line 724 at the interrogation frequency for this increased resistance at the interface 118. As shown, the absolute phase lag (i.e., the y-axis value for where points 716 and 726 lie) increases as resistance increases by shifting further towards −90 at the same interrogation frequency along y-axis 708.

In Bode plot 730 of FIG. 7, the resistance at the interface, such as Interface_Res 408, has increased further. Thus, solid line 732 represents the magnitude of the response of the thermal sensor 116 when driven at various frequencies 702 and as measured in dB of attenuation (relative to DC excitation) along y-axis 704; dotted line 734 represents the phase lag of the thermal sensor 116 behind the drive signal when driven at various frequencies 702 and as measured in degrees along y-axis 706; and point 736 represents the phase lag of dotted line 734 at the interrogation frequency for this further increased resistance at the interface 118. As shown, the absolute phase lag (i.e., the y-axis value for where points 716, 726, and 736 lie) increases as resistance increases by shifting further towards −90 at the same interrogation frequency along y-axis 708.

In FIG. 8, graph 800 depicts the predicted temperature phase lag at the interrogation frequency with varying interface resistance. Thermometer phase lags (black dots 810, 812, 816, 818, 820, 822, 824, 826, and 828) are predicted by the thermal model at the interrogation frequency for various thermal interface 118 resistances, and a 3rd order polynomial fit (dotted line 830) to these data points may be used to estimate the thermal resistance in a similar real-world circuit exhibiting any phase lag in the range of 60° to 90° when driven at the interrogation frequency.

As described below, in various implementations, the described methods may include a calibration process, a quality control (QC) process for testing a thermal component (e.g., TEC assembly 123), a QC process for testing a consumable (e.g., flow cell cartridge 122), and a diagnostic process for testing during consumable load to instrument.

Figure 9:
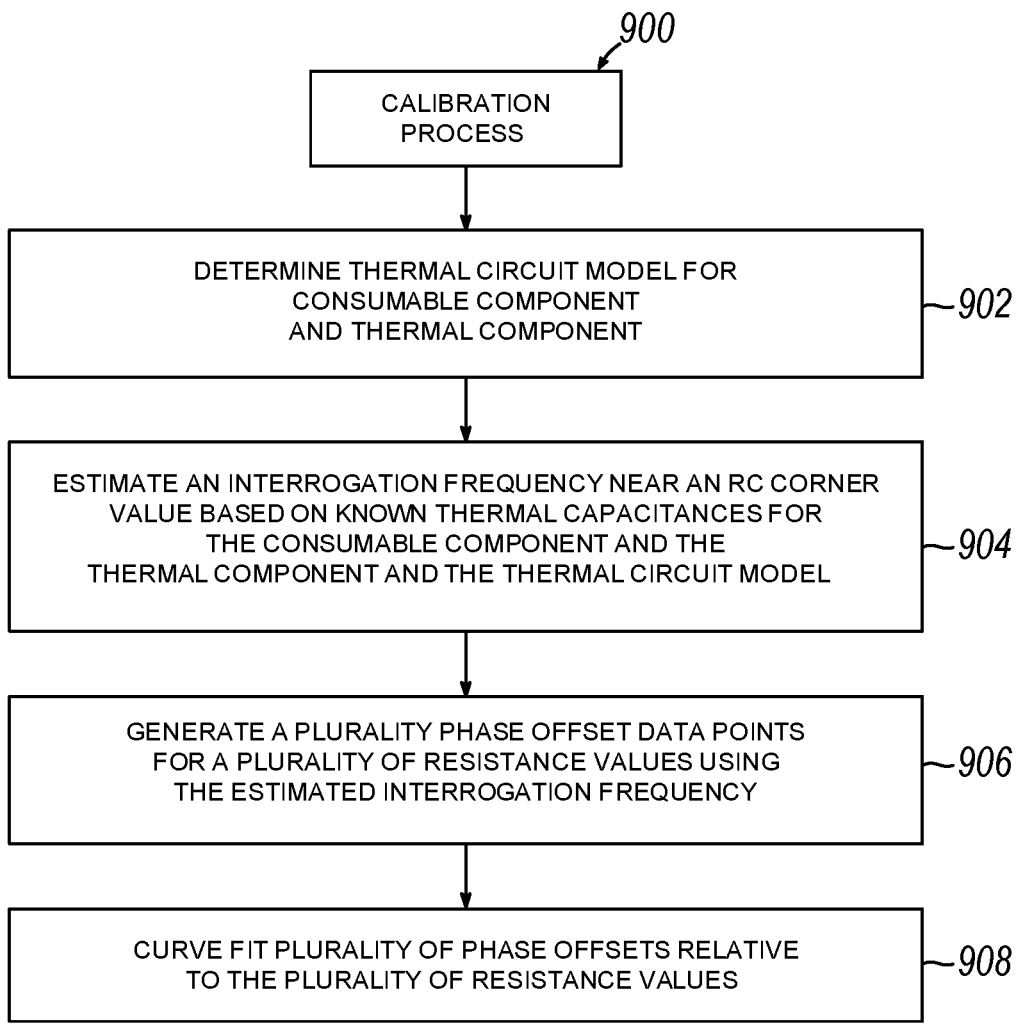
FIG. 9 depicts a flowchart of a calibration process for use with the described test methods.

FIG. 9 depicts a flowchart of calibration process 900, which includes determining a thermal circuit model for a consumable component (e.g., flow cell cartridge 122) and a thermal component (e.g., TEC assembly 123) at block 902; estimating an interrogation frequency near an RC corner value based on known thermal capacitances for the consumable component and the thermal component and the thermal circuit model at block 904; generating a plurality phase offset data points for a plurality of resistance values using the estimated interrogation frequency at block 906; and curve fitting the plurality of phase offsets relative to the plurality of resistance values at block 908.

Determining a thermal circuit model for a consumable component and a thermal component, block 902, may include generating an electrical-equivalent circuit having one or more of a thermal capacitance and/or a thermal resistance component for each component of the thermal system, with a resistance component illustrative of thermal resistance at the interface (e.g., thermal interface 118). In the implementation described herein, the consumable component and thermal component are each modeled as having a thermal capacitance, such as shown in FIG. 4. In some implementations, the thermal capacitance for the consumable component may be determined either from data from a manufacturer or via testing such as calculating thermal capacitance by (Material specific heat capacity (in J/g-K)× Material mass) or by (Material volume heat capacity (in J/cc-K)×Material volume). Similarly, the thermal capacitance for the consumable component may be determined either from data from a manufacturer or via testing such as measuring thermal capacitance with calorimetric techniques that generally involve measuring the temperature increase when a known amount of heat is added to a sample. In some implementations, some modeled components may have negligible values when compared to other components such that they may be considered to effectively be removed from the modeled system.

Once the electrical-equivalent circuit for the thermal system is determined, an estimation of an interrogation frequency near an RC corner value may be performed based on the known thermal capacitances for the consumable component and the thermal component and the thermal circuit model, block 904. That is, all of the components of the electrical-equivalent circuit except the interface resistance may be determined either from data from a manufacturer or testing, and the thermal circuit may be modeled or simulated, such as using SPICE modeling.

In the implementation described herein, the electrical-equivalent circuit of FIG. 4 is used to generate a Bode plot, shown in FIG. 5, showing the magnitude of the system response in 512 and phase response (in degrees) at different drive frequencies (in Hz). Response output magnitude may be shown in either degrees C. or K, if an accurate drive amplitude is used in the model; or it may be dB of attenuation below the drive amplitude. As shown in FIG. 5, the Bode plot for the phase response curve 514 depicts an initial phase drop due to the time constant of the TEC itself (i.e., its thermal capacitance combined with convection loss to ambient, which is an illustration of how quickly (or slowly) heat may be transmitted to the environment. An interrogation frequency may be estimated based on the Bode plot as a frequency where the slope is greatest, which corresponds to the RC corner of the electrical-equivalent circuit of the thermal system. As shown in FIG. 5, the RC corner may be estimated as approximately 0.3 Hz. In some implementations, the estimate of the interrogation frequency may include iterating through resistance values to optimize or converge the model to determine the RC corner and the corresponding interrogation frequency.

Once the interrogation frequency is estimated or otherwise determined, a plurality of phase offset data points may be generated for a plurality of resistance values using the estimated interrogation frequency, block 906. That is, a plurality of resistance values for the interface resistance may be input to the model to determine a plurality of corresponding modeled system responses, such as those shown in FIG. 7. As shown, the phase response at each resistance value increases negatively with increasing thermal resistance values for the interface as shown by points 716, 726, 736 The plurality of phase offset data points may be plotted relative to the plurality of corresponding resistance values for the model and a curve fit, block 908, may be performed for the plurality of phase offsets relative to the plurality of resistance values to generate a phase to resistance model equation.

Figure 10:
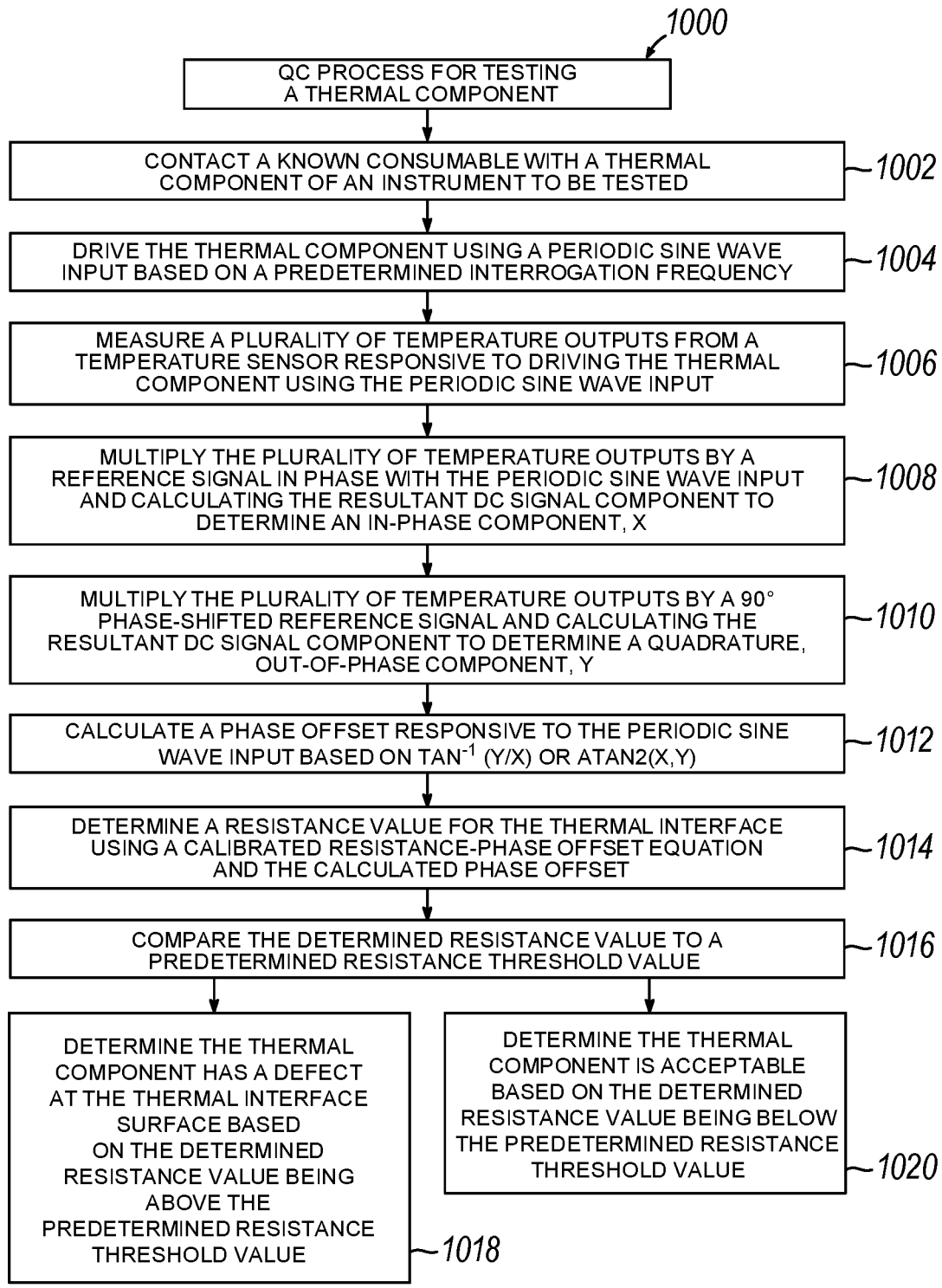
FIG. 10 depicts a flowchart of a quality control (QC) process for testing a thermal component.

While the process 900 may be used to generate a phase to resistance model for the thermal component (e.g., TEC assembly 123), FIG. 10 depicts a flowchart of an implementation utilizing the phase to resistance model for a QC process 1000 for testing the thermal component. The QC process 1000 for testing a thermal component, such as a TEC 114 itself or a TEC assembly 123, may include contacting a known consumable with a thermal component of an instrument to be tested, block 1002. The known consumable may be pre-tested consumable component, such as a flow cell 110, carrier plate 112, flow cell assembly 123, or other consumable component that has a known acceptable interface resistance.

The QC process 1000 of this example further includes driving the thermal component using a periodic sine wave input based on a predetermined interrogation frequency at block 1004. Driving the thermal component using the periodic sine wave input may include using a signal generator to output a sinusoidal input at an interrogation frequency estimated during the calibration process 900. In other implementations, other interrogation frequencies may be used.

The QC process 1000 of this example further includes measuring a plurality of temperature outputs from a thermal sensor (e.g., thermal sensor 118) that is responsive to driving the thermal component using the periodic sine wave input, block 1006. In some implementations, the temperature outputs may be logged in a log file or data table and/or periodically polled a predetermined number of times during the process 1000.

The plurality of temperature outputs may be multiplied by a reference signal in phase with the periodic sine wave input and a resultant DC signal component may be calculated to determine an in-phase component, X, block 1008. The reference signal may be any signal having a frequency that is the same as the interrogation frequency, including, for instance, the periodic sine wave input itself. The resultant DC signal may be calculated based on a sinusoidal curve fit of the resulting multiplied temperature outputs with the reference signal to determine the offset, which is the in-phase component, X. In other implementations, the temperature outputs may be averaged over a predetermined time period to determine the average offset as the in-phase component, X.

The plurality of temperature outputs may also be multiplied by a 90° phase-shifted reference signal; and a resultant DC signal component may be calculated to determine a quadrature, out-of-phase component, Y, block 1010. The reference signal may be any signal having a frequency that is the same as the interrogation frequency that is 90° phase-shifted, including, for instance, a 90° phase-shifted signal of the periodic sine wave input itself. The resultant DC signal may be calculated based on a sinusoidal curve fit of the resulting multiplied temperature outputs with the reference signal to determine the offset, which is the out-of-phase component, Y. In other implementations, the resulting multiplied temperature outputs with the reference signal may be averaged over a predetermined time period to determine the average offset as the out-of-phase component, Y.

The phase offset responsive to the periodic sine wave input may be calculated based on $\tan^{-1}(Y/X)$ or a $\tan 2(X,Y)$, block 1012, where Y is the out-of-phase component and X is the in-phase component. The phase offset may then be used to calculate or determine a corresponding resistance value for the thermal interface using a calibrated resistance-phase offset equation and the calculated phase offset, block 1014, such as the calibrated resistance-phase offset equation determined by the calibration process 900. In some implementations, the resistance value determination, block 1014, may be omitted and the QC process 1000 may utilize the phase offset value directly when compared to a predetermined phase offset threshold for blocks 1016, 1018, 1020, which are described in further detail below.

Using the determined resistance value, the QC process 1000 of the present example further includes comparing the determined resistance value to a predetermined resistance threshold value, block 1016. The predetermined resistance threshold value may be set as a resistance value where insufficient heat transfer occurs between the thermal component being tested and the known consumable because of a defect in the thermal component. The predetermined resistance threshold value may be empirically determined based on testing of several thermal components and consumables, such as the values shown in FIG. 14. In some instances, the predetermined resistance threshold value may include a margin of error to account for the variation of the thermal components, such as a value of 0.45 K/W, for instance, in the particular arrangement described in reference to FIG. 14. Also, in some implementations, determining a corresponding resistance value for the thermal interface using a calibrated resistance-phase offset equation and the calculated phase offset, block 1014, may be omitted by using a direct phase offset compared to a phase offset threshold value for 1016.

The QC process 1000 of this example may further include determining that the thermal component has a defect at the thermal interface surface (e.g., interface surface 118), based on the determined resistance value being above the predetermined resistance threshold value, block 1018. The defect at the thermal interface may be any defect, such as dust, dirt, dried reagents, and/or a defect in the thermal component, such as a defect in the TEC 114 itself, a defect in a surface of the TEC 114, or any other defect. In some implementations, the QC process 1000 may further include setting a flag indicating that the thermal component has a defect such that an automated quality control system may move or otherwise flag the thermal component as having a defect. In other implementations, a light may be turned on (e.g., a red lamp may be lit indicating to a user that the thermal component has a defect), a pop-up indicator may be launched, and/or another process may be launched in response to the determination that the thermal component has a defect, block 1018. In some implementations, determining that the thermal component has a defect at the thermal interface surface, block 1018, may be based on the determined resistance value being equal to or above the predetermined resistance threshold value.

If the determined resistance value is not above (or at) the predetermined resistance threshold value, the QC process 1000 of the present example then determines that the thermal component is acceptable, based on the determined resistance value being below the predetermined resistance threshold value, block 1020. In response to the determination that the thermal component is acceptable, block 1020, the QC process 1000 of the present example may further include setting a flag indicating that the thermal component is acceptable such that an automated quality control system may move or otherwise flag the thermal component as passing the QC process 1000. In other implementations, a light may be turned on (e.g., a green lamp may be lit indicating to a user that the thermal component is acceptable), a pop-up indicator may be launched, and/or another process may be launched in response to the determination that the thermal component is acceptable, block 1020. In some implementations, determining that the thermal component is acceptable, block 1020, may be based on the determined resistance value being equal to or below the predetermined resistance threshold value.

Figure 11:
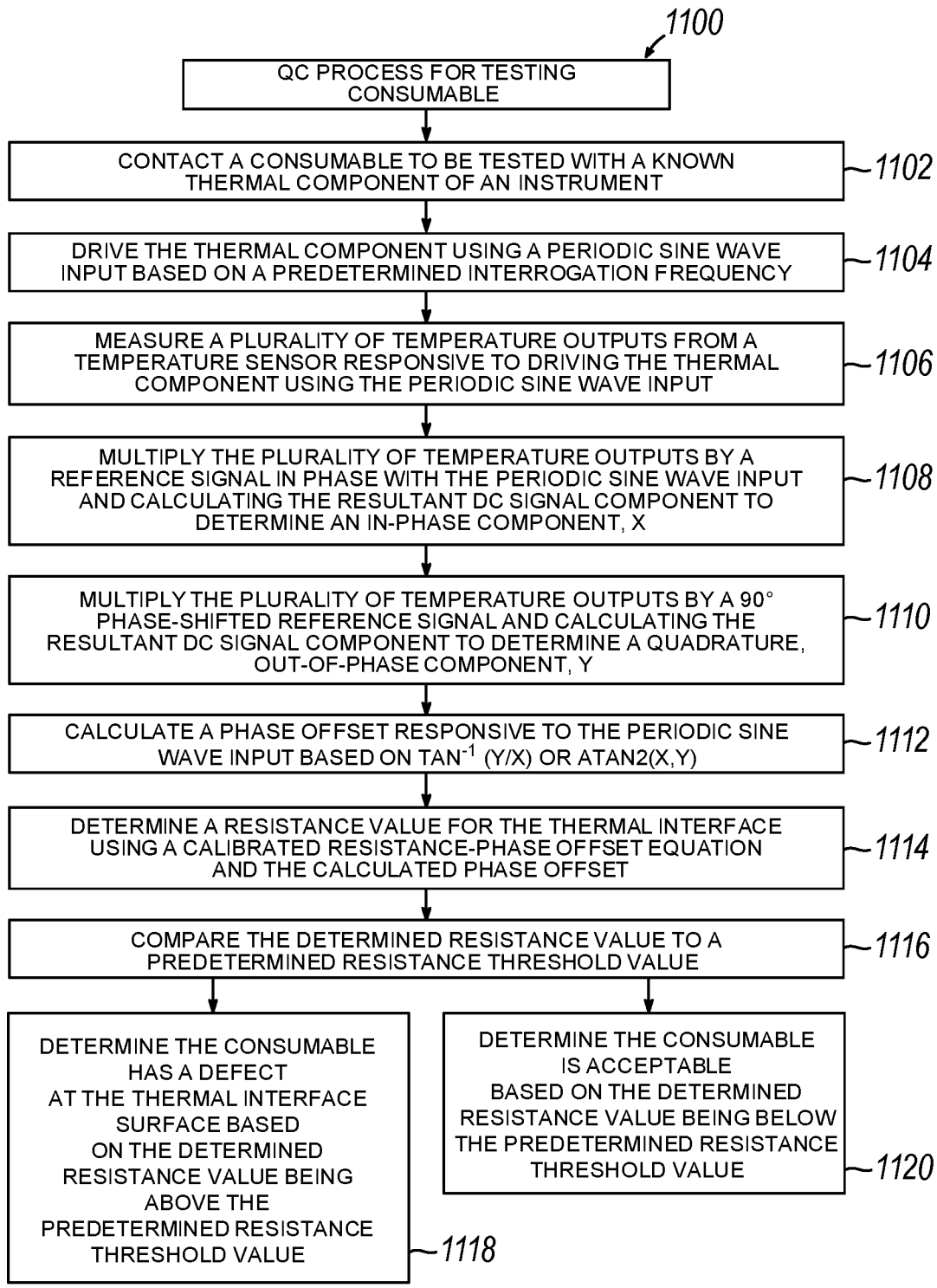
FIG. 11 depicts a flowchart of a QC process for testing a consumable.

FIG. 11 depicts a flowchart of an implementation utilizing the phase to resistance model for a QC process for testing a consumable 1100. The QC process 1100 may be used to test a consumable such as a flow cell 110, carrier plate 112, flow cell assembly 123, or other consumable component that has a known acceptable interface resistance. The QC process 1100 may include contacting the consumable to be tested with a known thermal component of the instrument, block 1102. The known thermal component may be pre-tested thermal component, such as a TEC 114, TEC assembly 123, or other thermal component that has a known acceptable interface resistance.

The QC process 1100 of the present example includes driving the thermal component using a periodic sine wave input based on a predetermined interrogation frequency, block 1104. Driving the thermal component using the periodic sine wave input may include using a signal generator to output a sinusoidal input at an interrogation frequency estimated during the calibration process 900. In other implementations, other interrogation frequencies may be used.

The QC process 1100 of the present example further includes measuring a plurality of temperature outputs from a thermal sensor (e.g., thermal sensor 118) that is responsive to driving the thermal component using the periodic sine wave input, block 1106. In some implementations, the temperature outputs may be logged in a log file or data table and/or periodically polled a predetermined number of times during the process 1100. The plurality of temperature outputs may be multiplied by a reference signal in phase with the periodic sine wave input and a resultant DC signal component may be calculated to determine an in-phase component, X, block 1108. The reference signal may be any signal having a frequency that is the same as the interrogation frequency, including, for instance, the periodic sine wave input itself. The resultant DC signal may be calculated based on a sinusoidal curve fit of the resulting multiplied temperature outputs with the reference signal to determine the offset, which is the in-phase component, X. In other implementations, the temperature outputs may be averaged over a predetermined time period to determine the average offset as the in-phase component, X.

The plurality of temperature outputs may also be multiplied by a 90° phase-shifted reference signal; and a resultant DC signal component may be calculated to determine a quadrature, out-of-phase component, Y, block 1110. The reference signal may be any signal having a frequency that is the same as the interrogation frequency that is 90° phase-shifted, including, for instance, a 90° phase-shifted signal of the periodic sine wave input itself. The resultant DC signal may be calculated based on a sinusoidal curve fit of the resulting multiplied temperature outputs with the reference signal to determine the offset, which is the out-of-phase component, Y. In other implementations, the resulting multiplied temperature outputs with the reference signal may be averaged over a predetermined time period to determine the average offset as the out-of-phase component, Y.

The phase offset responsive to the periodic sine wave input may be calculated based on $\tan^{-1}(Y/X)$ or a $\tan 2(X,Y)$, block 1112, where Y is the out-of-phase component and X is the in-phase component. The phase offset may then be used to calculate or determine a corresponding resistance value for the thermal interface (e.g., thermal interface 118)

using a calibrated resistance-phase offset equation and the calculated phase offset, block 1114, such as the calibrated resistance-phase offset equation determined by the calibration process 900. In some implementations, the resistance value determination, block 1114, may be omitted and the QC process 1100 may utilize the phase offset value directly when compared to a predetermined phase offset threshold for blocks 1116, 1118, 1120, which are described in further detail below.

Using the determined resistance value, the QC process 1100 of this example further includes comparing the determined resistance value to a predetermined resistance threshold value, block 1116. The predetermined resistance threshold value may be set as a resistance value where insufficient heat transfer occurs between the consumable being tested and the known thermal component because of a defect in the consumable. The predetermined resistance threshold value may be empirically determined based on testing of several thermal components and consumables, such as the values shown in FIG. 15. In some instances, the predetermined resistance threshold value may include a margin of error to account for the variation of the thermal components, such as a value of 0.45 K/W or 0.375 K/W, for instance, in the particular consumable arrangements described in reference to FIG. 15.

The QC process 1100 of this example may further include determining that the consumable has a defect at the thermal interface surface (e.g., interface surface 118), based on the determined resistance value being above the predetermined resistance threshold value, block 1118. The defect at the thermal interface may be any defect, such as dust, dirt, dried reagents, and/or a defect in the consumable itself, such as a defect in a substrate of the consumable, a defect in an adhesive bond of the consumable, or any other defect. In some implementations, the QC process 1100 may further include setting a flag indicating that the consumable has a defect such that an automated quality control system may move or otherwise flag the consumable as having a defect. In other implementations, a light may be turned on (e.g., a red lamp may be lit indicating to a user that the consumable has a defect), a pop-up indicator may be launched, and/or another process may be launched in response to the determination that the consumable has a defect, block 1118. In some implementations, determining that the consumable has a defect at the thermal interface surface responsive to the determined resistance value being above the predetermined resistance threshold value, block 1118, may be based on the determined resistance value being equal to or above the predetermined resistance threshold value.

If the determined resistance value is not above (or at) the predetermined resistance threshold value, the QC process 1100 of the present example then determines that the consumable is acceptable, based on the determined resistance value being below the predetermined resistance threshold value, block 1120. In response to the determination that the consumable is acceptable, the process 1100 may further include setting a flag indicating that the consumable is acceptable such that an automated quality control system may move or otherwise flag the consumable as passing the QC process 1100. In other implementations, a light may be turned on (e.g., a green lamp may be lit indicating to a user that the consumable is acceptable), a pop-up indicator may be launched, and/or another process may be launched in response to the determination that the consumable is acceptable, block 1120. In some implementations, determining that the consumable is acceptable, block 1120, may be based on the determined resistance value being equal to or below the predetermined resistance threshold value.

Figure 12:
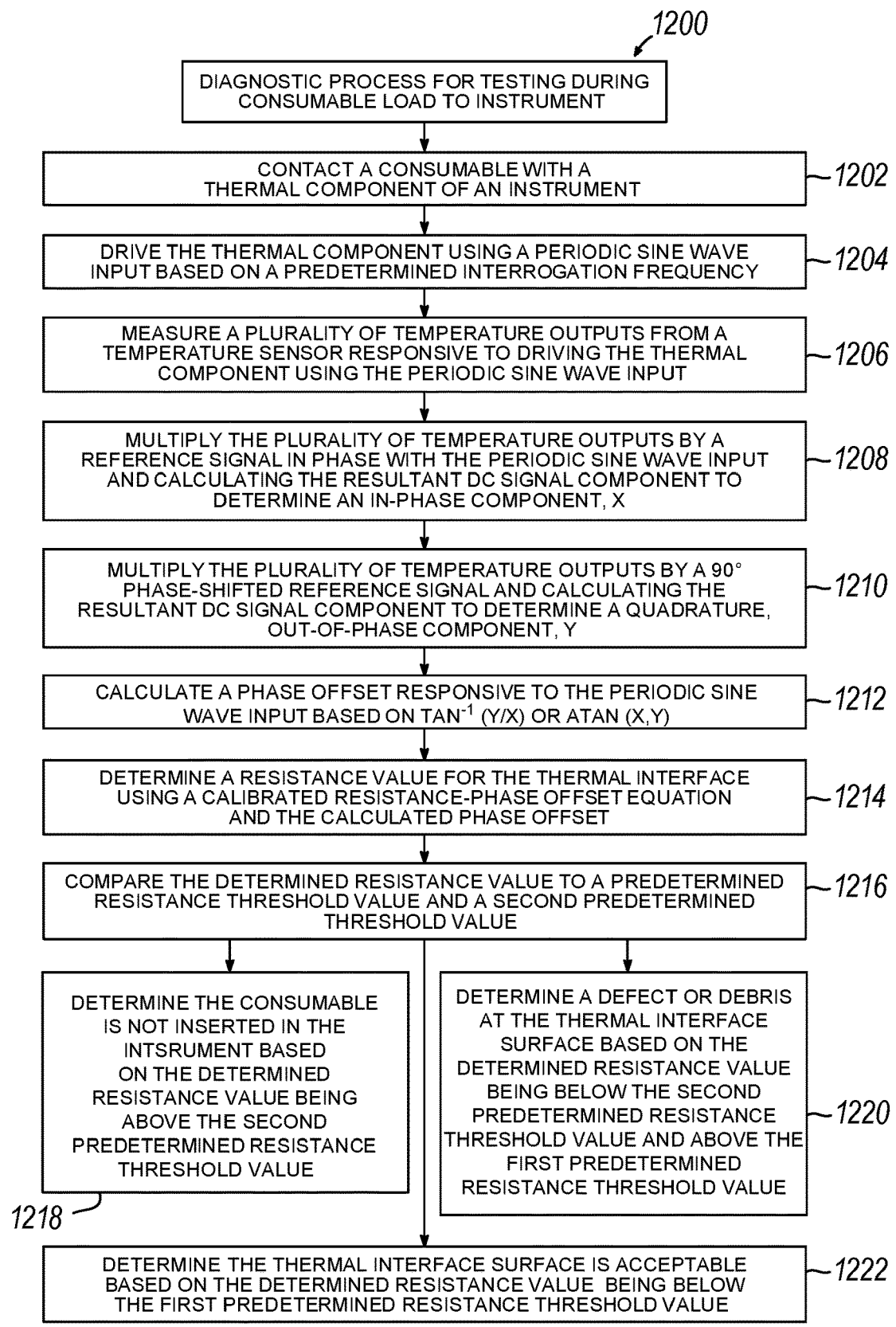
FIG. 12 depicts a flowchart of a diagnostic process for testing during consumable load to instrument.

FIG. 12 depicts a flowchart of diagnostic process for testing the loading of a consumable to an instrument 1200 for QC purposes. In some implementations, such instruments may include enclosures or other components that may obscure visual inspection of a thermal interface (e.g., thermal interface 118) between the consumable and a thermal component of the instrument. For instance, the upper surface of a TEC 114 or TEC assembly 123 may not be visible to the user of the instrument. When a consumable, such as a flow cell cartridge 122, and/or the flow cell 110 itself, is inserted into the instrument, the consumable and the corresponding thermal component, such as a TEC 112 or TEC 123 assembly with which the consumable interfaces for thermal control, may be inside a housing of the instrument and obscured from view. The housing of the instrument may generally limit or reduce contaminants from affecting processes therein. However, ensuring that the thermal interface between the consumable and the thermal component is free from debris, such as dust, dirt, liquid, etc., may be difficult to do without disassembly of the housing and/or portions of the instrument in order to visually inspect the surfaces of the thermal interface. Accordingly, the diagnostic process 1200 of this example may be implemented by the instrument as part of a pre-run quality control check to determine that the consumable is loaded into the instrument and the thermal interface between the consumable and the instrument has an acceptably low thermal resistance such that sufficient thermal control of the consumable by the thermal component is achievable.

In some implementations, the diagnostic process 1200 may include first contacting the consumable with a thermal component of the instrument, block 1202. As noted above, the thermal component may be pre-tested thermal component, such as a TEC 114, TEC assembly 123, or other thermal component that has a known acceptable interface resistance when the instrument was manufactured. In some implementations, contacting the consumable with the thermal component may include a user inserting a flow cell cartridge 123 and/or flow cell 1120 into the instrument and the instrument running an automated process to engage the flow cell cartridge 123 and/or flow cell 110 with the thermal component.

The diagnostic process 1200 of the present example further includes driving the thermal component using a periodic sine wave input based on a predetermined interrogation frequency, block 1204. Driving the thermal component using the periodic sine wave input may include using a signal generator to output a sinusoidal input at an interrogation frequency estimated during the calibration process 900. In other implementations, other interrogation frequencies may be used. In some implementations, data for the periodic sine wave input may be stored in a memory or storage device of the instrument.

The diagnostic process 1200 of the present example further includes measuring a plurality of temperature outputs from a thermal sensor (e.g., thermal sensor 118) that is responsive to driving the thermal component using the periodic sine wave input, block 1206. In some implementations, the temperature outputs may be logged in a log file or data table and/or periodically polled a predetermined number of times during the process 1200. The plurality of temperature outputs may be multiplied by a reference signal in phase with the periodic sine wave input and a resultant DC signal component may be calculated to determine an in-phase component, X, block 1208. The reference signal may be any signal having a frequency that is the same as the interrogation frequency, including, for instance, the periodic sine wave input itself. The resultant DC signal may be calculated based on a sinusoidal curve fit of the resulting multiplied temperature outputs with the reference signal to determine the offset, which is the in-phase component, X. In other implementations, the temperature outputs may be averaged over a predetermined time period to determine the average offset as the in-phase component, X.

The plurality of temperature outputs may also be multiplied by a 90° phase-shifted reference signal; and a resultant DC signal component may be calculated to determine a quadrature, out-of-phase component, Y, block 1210. The reference signal may be any signal having a frequency that is the same as the interrogation frequency that is 90° phase-shifted, including, for instance, a 90° phase-shifted signal of the periodic sine wave input itself. The resultant DC signal may be calculated based on a sinusoidal curve fit of the resulting multiplied temperature outputs with the reference signal to determine the offset, which is the out-of-phase component, Y. In other implementations, the resulting multiplied temperature outputs with the reference signal may be averaged over a predetermined time period to determine the average offset as the out-of-phase component, Y.

The phase offset responsive to the periodic sine wave input may be calculated based on $\tan^{-1}(Y/X)$ or a $\tan 2(X,Y)$, block 1212, where Y is the out-of-phase component and X is the in-phase component. The phase offset may then be used to calculate or determine a corresponding resistance value for the thermal interface (e.g., thermal interface 118) using a calibrated resistance-phase offset equation and the calculated phase offset, block 1214, such as the calibrated resistance-phase offset equation determined by the calibration process 900. The calibrated resistance-phase offset equation may be a single equation for a fleet of instruments that is stored in a memory or storage device of the instrument. In other implementations, the calibrated resistance-phase offset equation may be specific to the instrument and calculated during manufacturing and/or a final calibration of the instrument. In some implementations, the resistance value determination, block 1214, may be omitted and the diagnostic process 1200 may utilize the phase offset value directly when compared to a predetermined phase offset threshold for blocks 1216, 1218, 1220, 1222, which are described in further detail below.

Using the determined resistance value, the diagnostic process 1200 of this example further includes comparing the determined resistance value to a first predetermined resistance threshold value and a second predetermined resistance threshold value, block 1216. The first predetermined resistance threshold value may be set as a resistance value where insufficient heat transfer occurs between the consumable and the thermal component of the instrument because of a defect or debris at the thermal interface between the consumable and the thermal component. The first predetermined resistance threshold value may be empirically determined based on testing of several thermal components and consumables, such as the values shown in FIGS. 13-16.

In some instances, the first predetermined resistance threshold value utilized in the diagnostic process 1200 may include a margin of error to account for variation of the thermal components and/or consumables. The second predetermined resistance threshold value may be set as a resistance value sufficiently high in value that minimal or no heat transfer occurs between the thermal component and the consumable because either the consumable is not loaded into the instrument or the thermal interface between the thermal component and the consumable has a high resistance. The second predetermined resistance threshold value may be empirically determined based on testing of several instruments, such as the value shown in FIG. 13 where no consumable is loaded and the resistance value is, for instance, 1.313 K/W compared to an average value of 0.359454 for consumables loaded and having an acceptable thermal interface for the particular instrument tested. In some instances, the second predetermined resistance threshold value may include a margin of error to account for the variation of the thermal components and/or consumables.

Based on the comparison of the determined resistance value to the first predetermined resistance threshold value and the second predetermined resistance threshold value, the diagnostic process 1200 in this implementation proceeds to determine if the consumable is not properly inserted in the instrument, block 1218; if a defect or debris at the thermal interface will affect operation of the instrument, block 1220; or, if the resistance at the thermal interface is acceptable, to proceed with further processes of the instrument, block 1222.

The diagnostic process 1200 may determine that the consumable is not properly inserted in the instrument, block 1218, based on the determined resistance value being above the second predetermined resistance threshold value. If the diagnostic process 1200 determines that the consumable is not properly inserted in the instrument, block 1218, then the diagnostic process 1200 may further include setting a flag indicating that the consumable is not loaded to pause operation of the instrument and/or otherwise indicating to a user that the consumable is not properly loaded. In other implementations, a light may be turned on (e.g., a red lamp may be lit indicating to a user that the consumable is not properly loaded), a pop-up indicator may be launched, and/or another process may be launched in response to the determination that the consumable is not properly loaded, block 1218. In some implementations, determining that the consumable is not properly inserted in the instrument, block 1218, may be based on the determined resistance value being equal to or above the second predetermined resistance threshold value.

The diagnostic process 1200 may determine that a defect or debris at the thermal interface will affect operation of the instrument, block 1220, based on the determined resistance value being below the second predetermined resistance threshold value and above the first predetermined resistance threshold value. The defect or debris at the thermal interface may be any defect, such as dust, dirt, dried reagents, and/or a defect in the consumable, such as a defect in a substrate of the consumable, a defect in an adhesive bond of the consumable, or any other defect, and/or a defect in the thermal component itself, such as a defect in the TEC 114 itself, a defect in a surface of the TEC 114, or any other defect.

If the diagnostic process 1200 determines that a defect or debris at the thermal interface will affect operation of the instrument, block 1220, then the diagnostic process 1200 may set a flag indicating that there is debris or a defect at the thermal interface, to pause operation of the instrument and/or otherwise indicate to a user that the thermal interface between the consumable and thermal component of the instrument is obstructed. In other implementations, a light may be turned on (e.g., a red or yellow lamp may be lit indicating to a user debris or a defect with the thermal interface), a pop-up indicator may be launched, and/or another process may be launched in response to the determination of a defect or debris at the thermal interface, block 1220. In some implementations, the diagnostic process 1200 may initiate an ejection operation to eject the consumable such that the user may clean the consumable, service the thermal component, and/or reinsert the consumable if improperly inserted or misaligned. In some implementations, determining that a defect or debris at the thermal interface will affect operation of the instrument, block 1220, may be based on the determined resistance value being equal to or above the first predetermined resistance threshold value.

If the determined resistance value is not above the first predetermined resistance threshold value, the diagnostic process 1200 may determine that the thermal interface is acceptable, block 1222. Based on the determination that the thermal interface is acceptable, the diagnostic process 1200 may further include setting a flag indicating that the thermal interface is acceptable such that the instrument may proceed with running; or otherwise flag the thermal interface as passing the diagnostic process. In other implementations, a light may be turned on (e.g., a green lamp may be lit indicating to a user that the thermal interface is acceptable), a pop-up indicator may be launched, and/or another process may be launched in response to the determination that the thermal interface is acceptable, block 1222. In some implementations, determining that the thermal interface is acceptable, block 1222, may be based on the determined resistance value being equal to or below the first predetermined resistance threshold value.

FIG. 13 depicts a table illustrating examples of repeated measurements using the described technique to demonstrate measurement repeatability. The data indicates that the measurement will readily resolve variations of just a few percent in the interface resistance, and therefore may have acceptable precision to distinguish between good and bad interfaces if the specification range is as narrow as about +20%/−0% of expected measurement. The table also lists an example of the result of a measurement when no consumable is installed. The measurement is >3.6 times higher, indicating that a missing consumable is easily detected with this measurement.

FIG. 14 depicts a table illustrating how the described measurement produces different results across several prototype instruments, using two different instances of the same consumable. The instrument variation is significantly higher than the measurement repeatability, indicating real part-to-part variation is being measured.

Figures 15, 16:
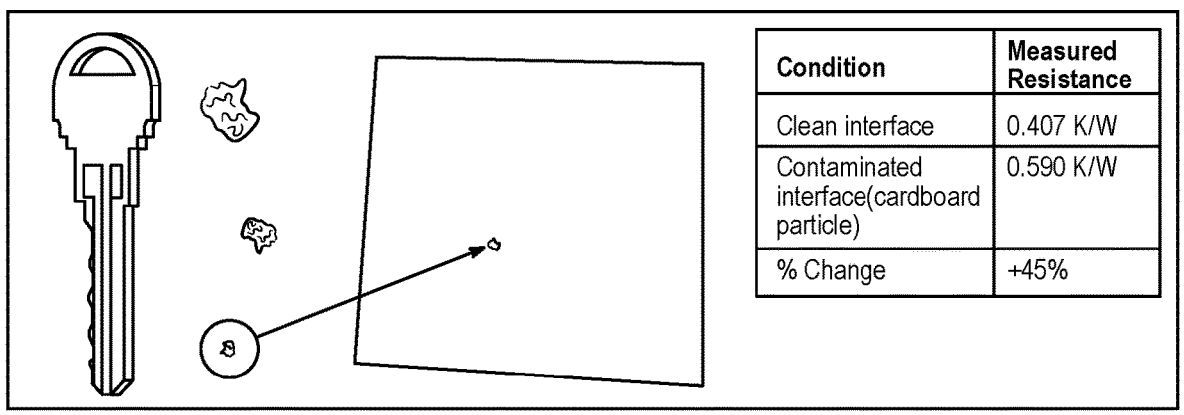
FIG. 15 depicts a table illustrating consumable variation.
FIG. 16 includes a diagrammatic illustration depicting example debris interfering with the thermal interface and a table depicting a greater than 45% increase in thermal resistance (R) due to this interference.

FIG. 15 depicts a table illustrating how the described measurement produces different results across several consumables in the same instrument. The consumable variation is only slightly higher than the measurement repeatability FIG. 16 shows a cardboard contaminant (circled) that may theoretically appear in the interface between a TEC 114 and a flow cell carrier plate 112. The measurement technique described may measure a 45% increase in interface resistance with the contaminant, demonstrating that real-world contamination may produce measurement results significantly greater than the measurement repeatability and greater than the instrument and consumable variation.

Figure 17:
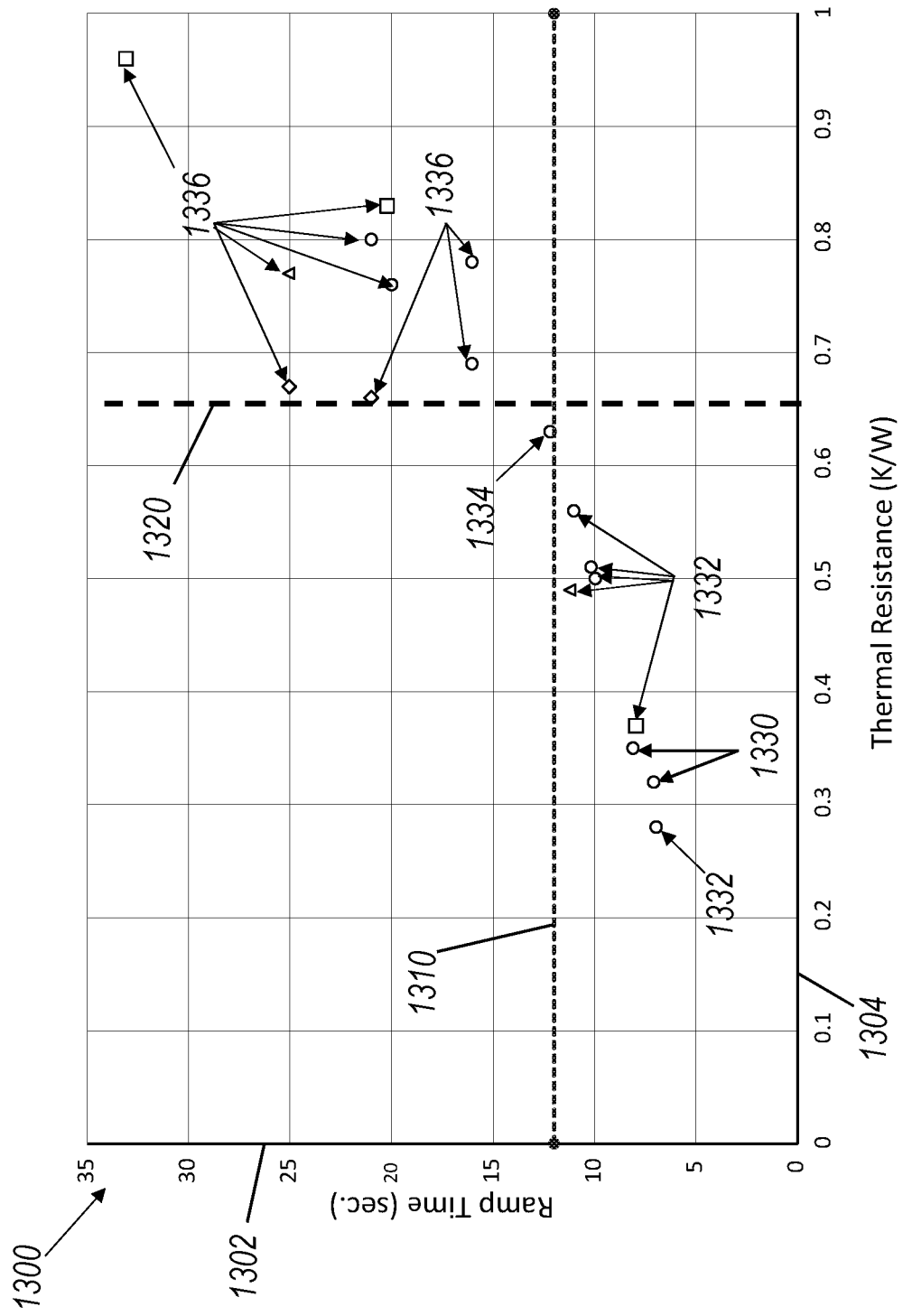
FIG. 17 depicts a graph illustrating examples of flow cell ramp-up times based on thermal resistance.

FIG. 17 depicts a graph 1300 showing examples of flow cell 122 ramp-up times based on thermal resistance, with various kinds of defects at thermal interface 118. Such defects may result from the presence of a contaminant 130 (e.g., dirt, dust, dehydrated reactants, debris, etc.) at thermal interface 118, from flow cell cartridge 112 being loaded improperly on TEC assembly 123, from a manufacturing defect in a component of flow cell cartridge 112 or TEC assembly 123, or from some other condition. In the present example, however, various data points 1332, 1334, 1336 represent conditions where a contaminant 130 is located at the thermal interface 118; while data points 1330 represent conditions where no contaminant 130 is present at the thermal interface 118.

In this graph 1300, the y-axis 1302 represents the ramp-up time of flow cell 122 in units of seconds; while the x-axis 1304 represents the thermal resistance at thermal interface 118 in units of K/W as determined by the method described herein. As used herein, the "ramp-up time" is the time it takes for a thermal sensor (not shown) placed within flow cell 110 to change from a prescribed starting temperature to a prescribed target temperature when driven by TEC 114.

In FIG. 17, horizontal line 1310 represents an example of a threshold ramp-up time value, where it is desirable for the ramp-up time for flow cell 122 to be below the threshold value represented by horizontal line 1310. In other words, ramp-up time values exceeding the threshold value represented by horizontal line 1310 may be deemed unacceptable. In this example, the threshold ramp-up time value is approximately 12 seconds. Alternatively, the threshold ramp-up time value may range from approximately 9 seconds to approximately 30 seconds. Vertical line 1320 represents an example of a threshold thermal resistance value, where it is desirable for the thermal resistance at thermal interface 118 to be below the threshold value represented by vertical line 1320. In other words, thermal resistance values exceeding the threshold value represented by vertical line 1320 may be deemed unacceptable. In this example, the threshold thermal resistance value is approximately 0.66 K/W. Alternatively, the threshold thermal resistance value may range from approximately 0.36 K/W to approximately 0.91 K/W.

Data points 1330, 1332 in FIG. 17 show conditions where the thermal interface 118 is acceptable, such that the ramp-up time of flow cell 122 is below the threshold represented by horizontal line 1310; and such that the thermal resistance value is below the threshold represented by vertical line 1320. As noted above, data points 1330 represent conditions where no contaminant 130 is present at thermal interface 118. Data points 1332 represent conditions where a contaminant 130 is present at thermal interface 118; yet such contaminants 130 do not affect the thermal interface 118 enough to increase the ramp-up time of flow cell 122 beyond the threshold value represented by horizontal line 1310 or to increase the thermal resistance beyond the value represented by vertical line 1320.

Data point 1334 shows a condition where the thermal interface 118 is unacceptable (or at least acceptable but undesirable) due to an interface defect. In the condition represented by data point 1334, even though the thermal resistance at thermal interface 118 is acceptably below the threshold value represented by vertical line 1320, the ramp-up time for flow cell 122 unacceptably (or undesirably) exceeds the threshold value represented by horizontal line 1310. In some scenarios, the condition represented by data point 1334 may be deemed unacceptable in the context of factory quality control; but may be deemed acceptable (albeit undesirable) in the context of field, in-use quality control. In other words, a thermal interface 118 presenting the condition associated with data point 1334 in a factory may be rejected; while a thermal interface 118 presenting the condition associated with data point 1334 in the field (i.e., operation by the final end-user) may be deemed acceptable (albeit undesirable).

Data points 1336 show conditions where the thermal interface 118 is unacceptable due to an interface defect causing unacceptably high ramp-up times for flow cell 122 and therefore unacceptably high thermal resistance values for thermal interface 118.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

As used herein, an element or step recited in the singular and preceded with the word "a" or "an" should be understood as not excluding plural of said elements or steps, unless such exclusion is explicitly stated. Furthermore, references to "one implementation" are not intended to be interpreted as excluding the existence of additional implementations that also incorporate the recited features. Moreover, unless explicitly stated to the contrary, implementations "comprising" or "having" an element or a plurality of elements having a particular property may include additional elements whether or not they have that property.

The terms "substantially" and "about" used throughout this Specification are used to describe and account for small fluctuations, such as due to variations in processing. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%, and/or 0%.

There may be many other ways to implement the subject technology. Various functions and elements described herein may be partitioned differently from those shown without departing from the scope of the subject technology. Various modifications to these implementations may be readily apparent to those skilled in the art, and generic principles defined herein may be applied to other implementations. Thus, many changes and modifications may be made to the subject technology, by one having ordinary skill in the art, without departing from the scope of the subject technology. For instance, different numbers of a given module or unit may be employed, a different type or types of a given module or unit may be employed, a given module or unit may be added, or a given module or unit may be omitted.

Underlined and/or italicized headings and subheadings are used for convenience only, do not limit the subject technology, and are not referred to in connection with the interpretation of the description of the subject technology. All structural and functional equivalents to the elements of the various implementations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

What is claimed is:

1. A method comprising:
contacting a known consumable with a thermal component of an instrument to be tested such that the consumable and the thermal component form a thermal interface;
driving the thermal component using a periodic sine wave input based on a predetermined interrogation frequency;
measuring a plurality of temperature outputs from a thermal sensor responsive to driving the thermal component using the periodic sine wave input, the thermal sensor being positioned and configured to detect a temperature of the thermal component;
multiplying the plurality of temperature outputs by a reference signal in phase with the periodic sine wave input and calculating a resultant direct current (DC) signal component to determine an in-phase component, X;
multiplying the plurality of temperature outputs by a 90° phase-shifted reference signal and calculating the resultant DC signal component to determine a quadrature, out-of-phase component, Y;
calculating a phase offset responsive to the periodic sine wave input based on $\tan^{-1}(Y/X)$ or a $\tan 2(X,Y)$;
determining a thermal resistance value for the thermal interface using a calibrated resistance-phase offset equation and the calculated phase offset; and
comparing the determined thermal resistance value to a predetermined thermal resistance threshold value.

2. The method of claim 1, the determined thermal resistance value being above the predetermined thermal resistance threshold value, the method further comprising determining that the thermal component has a defect at the thermal interface based on the determined thermal resistance value being above the predetermined resistance threshold value.

3. The method of claim 1, the determined thermal resistance value being below the predetermined thermal resistance threshold value, the method further comprising determining that the thermal component is acceptable based on the determined thermal resistance value being below the predetermined thermal resistance threshold value.

4. The method of claim 1, wherein the thermal component comprises a thermoelectric cooler.

5. The method of claim 1, wherein the consumable comprises a flow cell.

6. The method of claim 1, wherein the predetermined interrogation frequency is determined based on an estimated RC corner value for the known consumable and the thermal component of the instrument.

7. A method comprising:
contacting a consumable to be tested with a known thermal component of an instrument such that the consumable and the thermal component form a thermal interface;
driving the thermal component using a periodic sine wave input based on a predetermined interrogation frequency;
measuring a plurality of temperature outputs from a thermal sensor responsive to driving the thermal component using the periodic sine wave input, the thermal sensor being positioned and configured to detect a temperature of the thermal component;
multiplying the plurality of temperature outputs by a reference signal in phase with the periodic sine wave input and calculating a resultant direct current (DC) signal component to determine an in-phase component, X;

multiplying the plurality of temperature outputs by a 90° phase-shifted reference signal and calculating the resultant DC signal component to determine a quadrature, out-of-phase component, Y;

calculating a phase offset responsive to the periodic sine wave input based on $\tan^{-1}$ (Y/X) or a tan 2(X,Y);

determining a thermal resistance value for the thermal interface using a calibrated resistance-phase offset equation and the calculated phase offset; and comparing the determined thermal resistance value to a predetermined thermal resistance threshold value.

8. The method of claim 7, the determined thermal resistance value being above the predetermined thermal resistance threshold value, the method further comprising determining that the consumable has a defect at the thermal interface based on the determined thermal resistance value being above the predetermined resistance threshold value.

9. The method of claim 7 the determined thermal resistance value being below the predetermined thermal resistance threshold value, the method further comprising determining that the consumable is acceptable based on the determined thermal resistance value being below the predetermined thermal resistance threshold value.

10. The method of claim 7, wherein the thermal component comprises a thermoelectric cooler.

11. The method of claim 7, wherein the consumable comprises a flow cell.

12. The method of claim 7, wherein the predetermined interrogation frequency is determined based on an estimated RC corner value for the consumable and the known thermal component of the instrument.

13. A method comprising:

contacting a consumable with a thermal component of an instrument such that the consumable and the thermal component form a thermal interface;

driving the thermal component using a periodic sine wave input based on a predetermined interrogation frequency;

measuring a plurality of temperature outputs from a thermal sensor responsive to driving the thermal component using the periodic sine wave input, the thermal sensor being positioned and configured to detect a temperature of the thermal component;

multiplying the plurality of temperature outputs by a reference signal in phase with the periodic sine wave input and calculating a resultant direct current (DC) signal component to determine an in-phase component, X;

multiplying the plurality of temperature outputs by a 90° phase-shifted reference signal and calculating the resultant DC signal component to determine a quadrature, out-of-phase component, Y;

calculating a phase offset responsive to the periodic sine wave input based on $\tan^{-1}$ (Y/X) or a tan 2(X,Y);

determining a thermal resistance value for the thermal interface using a calibrated resistance-phase offset equation and the calculated phase offset;

comparing the determined thermal resistance value to a first predetermined thermal resistance threshold value;

comparing the determined thermal resistance value to a second predetermined thermal resistance threshold value; and determining a characteristic of the thermal interface based on the comparison of the determined thermal resistance value to the first and second predetermined thermal resistance threshold values.

14. The method of claim 13, the determined thermal resistance value being below the first predetermined thermal resistance threshold value, the method further comprising determining that the thermal interface is acceptable based on the determined thermal resistance value being below the first predetermined thermal resistance threshold value.

15. The method of claim 13, the determined thermal resistance value being above the second predetermined thermal resistance threshold value, the method further comprising determining that the consumable is not inserted in the instrument based on the determined thermal resistance value being above the second predetermined resistance threshold value.

16. The method of claim 13, the determined thermal resistance value being below the second predetermined thermal resistance threshold value and above the first predetermined thermal resistance threshold value, the method further comprising determining that a defect or debris is at the thermal interface based on the determined thermal resistance value being below the second predetermined thermal resistance threshold value and above the first predetermined thermal resistance threshold value.

17. The method of claim 13, wherein the thermal component comprises a thermoelectric cooler.

18. The method of claim 13, wherein the consumable comprises a flow cell used for sequencing by synthesis.

19. The method of claim 13, wherein the predetermined interrogation frequency is determined based on an estimated RC corner value for the consumable and the thermal component of the instrument.

20. A computer-readable medium having stored thereon a computer program comprising instructions to cause an instrument to execute the method of claim 13.

* * * * *

UNITED STATES PATENT AND TRADEMARK OFFICE
CERTIFICATE OF CORRECTION

| | |
|---|---|
| PATENT NO. | : 11,327,035 B2 |
| APPLICATION NO. | : 16/937781 |
| DATED | : May 10, 2022 |
| INVENTOR(S) | : W. Craig Bauer |

It is certified that error appears in the above-identified patent and that said Letters Patent is hereby corrected as shown below:

In the Claims

In Column 24, Line 37, Claim 2, before "resistance" insert -- thermal --, therefor.

In Column 25, Line 21, Claim 8, before "resistance" insert -- thermal --, therefor.

In Column 26, Line 29, Claim 15, before "resistance" insert -- thermal --, therefor.

Signed and Sealed this
Fifteenth Day of November, 2022

Katherine Kelly Vidal
*Director of the United States Patent and Trademark Office*